(12) United States Patent
Jetha et al.

(10) Patent No.: US 12,473,365 B2
(45) Date of Patent: Nov. 18, 2025

(54) FLT3 AGONIST ANTIBODIES AND USES THEREOF

(71) Applicant: Boehringer Ingelheim IO Canada, Inc., Toronto (CA)

(72) Inventors: Arif Jetha, Toronto (CA); Phil Gobeil, Toronto (CA); Melissa Beilschmidt, Toronto (CA); Dorothea Maetzel, Toronto (CA); Johan Fransson, Toronto (CA)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 1001 days.

(21) Appl. No.: 17/413,107

(22) PCT Filed: Dec. 17, 2019

(86) PCT No.: PCT/IB2019/001437
§ 371 (c)(1),
(2) Date: Jun. 11, 2021

(87) PCT Pub. No.: WO2020/128638
PCT Pub. Date: Jun. 25, 2020

(65) Prior Publication Data
US 2022/0025055 A1    Jan. 27, 2022

Related U.S. Application Data

(60) Provisional application No. 62/781,213, filed on Dec. 18, 2018.

(51) Int. Cl.
*C07K 16/28* (2006.01)

(52) U.S. Cl.
CPC ...... *C07K 16/2863* (2013.01); *C07K 2317/55* (2013.01); *C07K 2317/565* (2013.01); *C07K 2317/569* (2013.01); *C07K 2317/622* (2013.01)

(58) Field of Classification Search
CPC ............ C07K 16/2863; C07K 2317/55; C07K 2317/565; C07K 2317/569; C07K 2317/622; C07K 2317/24; C07K 2317/75; C07K 2317/92; C07K 16/28; C07K 16/40; A61K 2039/505; A61K 39/395; A61P 35/00
See application file for complete search history.

(56) References Cited

U.S. PATENT DOCUMENTS

| | | |
|---|---|---|
| 5,500,362 A | 3/1996 | Robinson et al. |
| 5,548,065 A | 8/1996 | Lemischka |
| 5,624,821 A | 4/1997 | Winter et al. |
| 5,635,388 A | 6/1997 | Bennett et al. |
| 5,648,260 A | 7/1997 | Winter et al. |
| 5,747,651 A | 5/1998 | Lemischka |
| 5,777,084 A | 7/1998 | Buhring |
| 5,821,337 A | 10/1998 | Carter et al. |
| 5,997,865 A | 12/1999 | Bennett et al. |
| 6,156,882 A | 12/2000 | Buhring et al. |
| 6,602,684 B1 | 8/2003 | Umana et al. |
| 7,183,385 B2 | 2/2007 | Comb et al. |
| 7,270,987 B1 | 9/2007 | Chien et al. |
| 7,371,826 B2 | 5/2008 | Presta |
| 8,071,099 B2 | 12/2011 | Li et al. |
| 8,178,292 B2 | 5/2012 | Yokota |
| 9,023,996 B2 | 5/2015 | Grosse-Hovest et al. |
| 9,974,865 B2 | 5/2018 | Lowe et al. |
| 2005/0014934 A1 | 1/2005 | Hinton et al. |
| 2007/0207164 A1 | 9/2007 | Lyman et al. |
| 2010/0093008 A1 | 4/2010 | Goss et al. |
| 2013/0156764 A1 | 6/2013 | Levis et al. |
| 2013/0288373 A1 | 10/2013 | Verstraete et al. |
| 2018/0118838 A1 | 5/2018 | Yu et al. |
| 2018/0280532 A1 | 10/2018 | Goldenberg |
| 2019/0002888 A1 | 1/2019 | Valmier |

FOREIGN PATENT DOCUMENTS

| | | |
|---|---|---|
| CN | 104288765 A | 1/2015 |
| EP | 0754230 A1 | 1/1997 |
| EP | 2516468 A1 | 10/2012 |
| EP | 3328891 A1 | 6/2018 |
| EP | 3436479 A1 | 2/2019 |
| EP | 3630841 A1 | 4/2020 |
| WO | 199426891 A2 | 11/1994 |
| WO | 9429351 A2 | 12/1994 |
| WO | 199428391 A1 | 12/1994 |
| WO | 199507348 A1 | 3/1995 |
| WO | 1995027062 A1 | 10/1995 |
| WO | 199634620 A1 | 11/1996 |
| WO | 199712633 A1 | 4/1997 |
| WO | 1998018923 A1 | 5/1998 |
| WO | 199846750 A1 | 10/1998 |

(Continued)

OTHER PUBLICATIONS

Chiu ML et al. Antibody Structure and Function: The Basis for Engineering Therapeutics. (Antibodies 2019 8, 55, 1-80) (Year: 2019).*

Almagro JC et al., Progress and Challenges in the Design and Clinical Development of Antibodies for Cancer Therapy Front. Immunol. 2018; 8:1751 (Year: 2018).*

Hasegawa H et al. Single amino acid substitution in LC-CDR1 induces Russell body phenotype that attenuates cellular protein synthesis through eIF2α phosphorylation and thereby downregulates IgG secretion despite operational secretory pathway traffic. (mAbs 2017, 9(5) 854-873) (Year: 2017).*

Al-Lazikani, Bissan et al. "Standard Conformations for the Canonical Structures of Immunoglobulins", (1997), J Mol Bio, 273, 927-928.

(Continued)

*Primary Examiner* — Karen A. Canella
*Assistant Examiner* — John J Skoko, III
(74) *Attorney, Agent, or Firm* — Kenneth J. Kalafus

(57) ABSTRACT

Described herein are anti-FLT3 agonistic antibodies. Such agonistic antibodies are useful for the expansion of dendritic cells and the treatment of cancer.

63 Claims, 7 Drawing Sheets
Specification includes a Sequence Listing.

(56) References Cited

FOREIGN PATENT DOCUMENTS

| | | | | |
|---|---|---|---|---|
| WO | 2002040044 | A2 | 5/2002 | |
| WO | 2003070899 | A2 | 8/2003 | |
| WO | 2005001048 | A2 | 1/2005 | |
| WO | 2005028506 | A2 | 3/2005 | |
| WO | 2006060021 | A2 | 6/2006 | |
| WO | 2006086111 | A2 | 8/2006 | |
| WO | 2008077546 | A1 | 7/2008 | |
| WO | 2009155015 | A1 | 12/2009 | |
| WO | 2011024113 | A1 | 3/2011 | |
| WO | 2011076922 | A1 | 6/2011 | |
| WO | 2011083124 | A1 | 7/2011 | |
| WO | 2011113041 | A2 | 9/2011 | |
| WO | 2012084895 | A2 | 6/2012 | |
| WO | 2016120216 | A1 | 8/2016 | |
| WO | 2016145099 | A1 | 9/2016 | |
| WO | 2017021362 | A1 | 2/2017 | |
| WO | 2017053889 | A2 | 3/2017 | |
| WO | 2017173410 | A1 | 10/2017 | |
| WO | 2017176760 | A2 | 10/2017 | |
| WO | 2017205747 | A1 | 11/2017 | |
| WO | 2018052556 | A1 | 3/2018 | |
| WO | 2018119279 | A1 | 6/2018 | |
| WO | 2018211018 | A1 | 11/2018 | |
| WO | 2018220584 | A1 | 12/2018 | |
| WO | 2018222935 | A1 | 12/2018 | |
| WO | 2019023097 | A1 | 1/2019 | |
| WO | 2019025484 | A1 | 2/2019 | |
| WO | 2019028027 | A1 | 2/2019 | |
| WO | 2020010284 | A1 | 1/2020 | |
| WO | WO-2020172457 | A1 * | 8/2020 | ............. A61P 25/28 |

OTHER PUBLICATIONS

Clackson, Tim et al. "Making antibody fragments using phage display libraries" (1991) Letters to Nature, vol. 352, 624-628.
Dong, Jian et al. "Flt-3 Ligand, A Potent Dendritic Cell Stimulator and Novel Antitumor Agent" (2002) Cancer Biology & Therapy, 1:5, 486-489.
Al-Lazikani, LMB, Standard Conformations for the Canonical Structures of Immunoglobulins, 1997.
Karlin, Proc. Natl. Acad. Sci., Methods for assessing the statistical significance of colecular sequence features, vol. 87, 1990.
MacCallum, JMB, Antibody-antigen Interactions, vol. 262, 1996.
Karlin, Proc. Natl Acad. Sci, Applications and statistics for multiple high scoring segments in high scoring sequences, vol. 90, 1993.
LeFranc, Developmental And Comparitive immunology, IMGT unique numbering for Immunoglobulin and T cell receptor variable domains and Ig superfamily V-like domains, vol. 27, 2003.
Altschul, J. Molec. Biol. Basic Local Alignment Search Tool, 1990.
Honegger, AP, Yet another numbering Scheme, vol. 39, 2001.
Li, Landes Bioscience, Cellcultire processes for monoclonal antibody production, 2010.
Whitelegg, Protein Engineering, WAM: an improved algorithm, 2000.
Lynch, Nature Publishing Group, Flt3 ligand induces tumor regression and antitumor immune responses in vivo, 1997.
Portolano, The J. of Immunology, Lack of Promiscuity in Autoantigen-Specific H and L Chain Combinations, vol. 150, 1993.
Silva, The J. of Biological Chem. The S228P Mutation prevents in Vivo and in Vitro IgG4 Fab-arm Exchange as Demonstatred using a Combination of Novel Quantitative immunoassays, 2015.
Glaesner, Diabetes, Engineeringand characterization og the long acting glucagon-like peptide-1 analogue LY21892265, vol. 26, 2010.
Chowdhury, Methods in Molecular Biology, Engineering Hotspotsfor Affinity Enhancement of Antibodies, 2008.
Reeves, AIDS Research, Systemic Dentritic Cell Moblization Associated with Administration of FLT3 Ligand to SIV-and SHIV-Infected Macagues, vol. 25, 2009.
Hoogenboom, Methods in Mol. Boi., Antibody Phage Display, vol. 178, 2001.
Cunningham, Reports, High-Resolution Epitope Mapping of hGH-Receptor Interactions of Alanine-Scanning Mutagenesis, 1989.
Wright, Reviews, Effect of glycosylation on antibody function, 1997.
Edelman, The Rockefeller Univ, The Covalent Structure of the entire ygimmunoglobulon molevule, 1969.
Okazaki, JMB, Fucose Depletion from Human IgG1 Oligosaccharide Enhances Binding Enthalpy, 2004.
Ohnuki, Tokyo Research Labs, Establishment of FUT8 knockout Chinese Hamster Ovary Cells, 2003.
Ripka, Archives of Biochem and Biophysics, 2 Chinese Hamster ovary Glycostatin Mutants affected in the conversion of GDP-Mannose to GDP-Fucose, vol. 249, 1986.
Kanda, Tokyo Research, Comparison of Cell Lines for stable Production of Fucose-Negative Antibodies with Enhanced ADCC, 2005.
Duncan, MRC, The binding site for Clq on LgG, vol. 332, 1988.
Choudhary et al., "Activation mechanisms of STAT5 by oncogenic Flt3-ITD", (2007), Blood, vol. 110, No. 1, 370-374.
Verstraete, Kenneth et al. "Structural insights into the extracellular assembly of the hematopoietic Flt3 signaling complex" (2011) Blood, vol. 118, No. 1, 60-68.
Whitelegg, Nicholas et al., "WAM: an improved algorithm for modelling antibodies on the Web" Protein Engineering, (2000) vol. 13, No. 12, 819-824.
Zeigler et al., "Cellular and molecular characterization of the role of the FLK-2/FLT-3 receptor tyrosine kinase in hematopoietic stem cells", (1994) Blood, vol. 84, No. 8, 2422-2430.

\* cited by examiner

SEQUENCE LISTING

<160> NUMBER OF SEQ ID NOS: 30

<210> SEQ ID NO 1
<211> LENGTH: 7
<212> TYPE: PRT
<213> ORGANISM: Artificial Sequence
<220> FEATURE:
<223> OTHER INFORMATION: Description of Artificial Sequence: Synthetic peptide

```
<400> SEQUENCE: 1

Gly Phe Thr Phe Ser Asn Tyr
1               5

<210> SEQ ID NO 2
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Asn Tyr Gly Met Ala
1               5

<210> SEQ ID NO 3
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

His Ser Gly Gly Gly Asp
1               5

<210> SEQ ID NO 4
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Ser Ile His Ser Gly Gly Gly Asp Thr Tyr Tyr Arg Asp Ser Val Lys
1               5                   10                  15

Gly

<210> SEQ ID NO 5
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Gly Arg Thr Pro Thr Gly Tyr Tyr Phe Asp His
1               5                   10

<210> SEQ ID NO 6
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Arg Ala Ser Glu Gly Ile His Asn Gly Leu Ala
1               5                   10

<210> SEQ ID NO 7
```

```
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Arg Ala Ser Glu Gly Ile His Asp Gly Leu Ala
1               5                   10

<210> SEQ ID NO 8
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Arg Ala Ser Glu Gly Ile His Ser Gly Leu Ala
1               5                   10

<210> SEQ ID NO 9
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Arg Ala Ser Glu Gly Ile His Thr Gly Leu Ala
1               5                   10

<210> SEQ ID NO 10
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Arg Ala Ser Glu Gly Ile His Leu Gly Leu Ala
1               5                   10

<210> SEQ ID NO 11
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Asn Ala Asn Ser Leu His Ser
1               5

<210> SEQ ID NO 12
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12
```

Gln Gln Tyr Tyr Asp Tyr Pro Leu Thr
1               5

<210> SEQ ID NO 13
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 13

Glu Val Gln Leu Val Glu Ser Gly Gly Asp Leu Val Gln Pro Gly Gly
1               5                   10                  15

Ser Leu Lys Leu Ser Cys Ala Pro Ser Gly Phe Thr Phe Ser Asn Tyr
            20                  25                  30

Gly Met Ala Trp Ile Arg Gln Ala Pro Thr Met Gly Leu Glu Trp Val
        35                  40                  45

Ala Ser Ile His Ser Gly Gly Gly Asp Thr Tyr Tyr Arg Asp Ser Val
    50                  55                  60

Lys Gly Arg Phe Thr Ile Ser Arg Asp Asn Ala Lys Asn Thr Leu Tyr
65                  70                  75                  80

Leu Gln Met Asp Ser Leu Arg Ser Glu Asp Thr Ala Thr Tyr Tyr Cys
                85                  90                  95

Ala Arg Gly Arg Thr Pro Thr Gly Tyr Tyr Phe Asp His Trp Gly Gln
            100                 105                 110

Gly Val Met Val Thr Val Tyr Ser
        115                 120

<210> SEQ ID NO 14
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 14

Ala Ile Gln Met Thr Gln Ser Pro Ala Ser Leu Ser Ala Ser Leu Gly
1               5                   10                  15

Glu Thr Val Thr Ile Glu Cys Arg Ala Ser Glu Gly Ile His Asn Gly
            20                  25                  30

Leu Ala Trp Tyr Gln Gln Lys Pro Gly Lys Ser Pro Gln Leu Leu Ile
        35                  40                  45

Tyr Asn Ala Asn Ser Leu His Ser Arg Val Pro Ser Arg Phe Ser Gly
    50                  55                  60

Ser Gly Ser Gly Thr Gln Phe Ser Leu Lys Ile Asn Ser Leu Gln Ser
65                  70                  75                  80

Glu Asp Val Ala Ser Tyr Phe Cys Gln Gln Tyr Tyr Asp Tyr Pro Leu
                85                  90                  95

Thr Phe Gly Ser Gly Thr Lys Leu Glu Ile Lys
            100                 105

<210> SEQ ID NO 15
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 15

Glu Val Gln Leu Leu Glu Ser Gly Gly Gly Leu Val Gln Pro Gly Gly
1               5                   10                  15

Ser Leu Arg Leu Ser Cys Ala Pro Ser Gly Phe Thr Phe Ser Asn Tyr
            20                  25                  30

Gly Met Ala Trp Val Arg Gln Ala Pro Gly Lys Gly Leu Glu Trp Val
        35                  40                  45

Ser Ser Ile His Ser Gly Gly Gly Asp Thr Tyr Tyr Arg Asp Ser Val
50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Arg Thr Pro Thr Gly Tyr Tyr Phe Asp His Trp Gly Gln
            100                 105                 110

Gly Thr Met Val Thr Val Ser Ser
        115                 120

<210> SEQ ID NO 16
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 16

Asp Ile Gln Met Thr Gln Ser Pro Ser Ser Leu Ser Ala Ser Val Gly
1               5                   10                  15

Asp Arg Val Thr Ile Thr Cys Arg Ala Ser Glu Gly Ile His Asn Gly
            20                  25                  30

Leu Ala Trp Tyr Gln Gln Lys Pro Gly Lys Val Pro Lys Leu Leu Ile
        35                  40                  45

Tyr Asn Ala Asn Ser Leu His Ser Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Val Ala Thr Tyr Phe Cys Gln Gln Tyr Tyr Asp Tyr Pro Leu
                85                  90                  95

Thr Phe Gly Gln Gly Thr Lys Leu Glu Ile Lys
            100                 105

<210> SEQ ID NO 17
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 17

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asn Tyr
            20                  25                  30

Gly Met Ala Trp Val Arg Gln Ala Pro Gly Lys Gly Leu Glu Trp Val
        35                  40                  45

Ala Ser Ile His Ser Gly Gly Gly Asp Thr Tyr Tyr Arg Asp Ser Val

```
                    50                  55                  60
Lys Gly Arg Phe Thr Ile Ser Arg Asp Asn Ala Lys Asn Ser Leu Tyr
 65                  70                  75                  80

Leu Gln Met Asn Ser Leu Arg Ala Glu Asp Thr Ala Val Tyr Tyr Cys
                 85                  90                  95

Ala Arg Gly Arg Thr Pro Thr Gly Tyr Tyr Phe Asp His Trp Gly Gln
            100                 105                 110

Gly Thr Met Val Thr Val Ser Ser
            115                 120

<210> SEQ ID NO 18
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 18

Ala Ile Gln Met Thr Gln Ser Pro Ser Ser Leu Ser Ala Ser Val Gly
  1               5                  10                  15

Asp Arg Val Thr Ile Thr Cys Arg Ala Ser Glu Gly Ile His Asn Gly
             20                  25                  30

Leu Ala Trp Tyr Gln Gln Lys Pro Gly Lys Ala Pro Lys Leu Leu Ile
         35                  40                  45

Tyr Asn Ala Asn Ser Leu His Ser Gly Val Pro Ser Arg Phe Ser Gly
 50                  55                  60

Ser Gly Ser Gly Thr Asp Phe Thr Leu Thr Ile Ser Ser Leu Gln Pro
 65                  70                  75                  80

Glu Asp Phe Ala Thr Tyr Tyr Cys Gln Gln Tyr Tyr Asp Tyr Pro Leu
                 85                  90                  95

Thr Phe Gly Gln Gly Thr Lys Leu Glu Ile Lys
            100                 105

<210> SEQ ID NO 19
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 19

Glu Val Gln Leu Val Glu Ser Gly Gly Gly Leu Val Gln Pro Gly Gly
  1               5                  10                  15

Ser Leu Arg Leu Ser Cys Ala Pro Ser Gly Phe Thr Phe Ser Asn Tyr
             20                  25                  30

Gly Met Ala Trp Val Arg Gln Ala Pro Gly Lys Gly Leu Val Trp Val
         35                  40                  45

Ser Ser Ile His Ser Gly Gly Gly Asp Thr Tyr Tyr Arg Asp Ser Val
         50                  55                  60

Lys Gly Arg Phe Thr Ile Ser Arg Asp Asn Ala Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Gly Arg Thr Pro Thr Gly Tyr Tyr Phe Asp His Trp Gly Gln
            100                 105                 110

Gly Thr Met Val Thr Val Ser Ser
```

<210> SEQ ID NO 20
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 20

Ala Ile Gln Leu Thr Gln Ser Pro Ser Ser Leu Ser Ala Ser Val Gly
1               5                   10                  15

Asp Arg Val Thr Ile Thr Cys Arg Ala Ser Glu Gly Ile His Asn Gly
            20                  25                  30

Leu Ala Trp Tyr Gln Gln Lys Pro Gly Lys Ala Pro Lys Leu Leu Ile
        35                  40                  45

Tyr Asn Ala Asn Ser Leu His Ser Arg Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Phe Cys Gln Gln Tyr Asp Tyr Pro Leu
                85                  90                  95

Thr Phe Gly Gln Gly Thr Lys Leu Glu Ile Lys
            100                 105

<210> SEQ ID NO 21
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 21

Gln Val Gln Leu Val Glu Ser Gly Gly Val Val Gln Pro Gly Arg
1               5                   10                  15

Ser Leu Arg Leu Ser Cys Ala Ala Ser Gly Phe Thr Phe Ser Asn Tyr
            20                  25                  30

Gly Met Ala Trp Val Arg Gln Ala Pro Gly Lys Gly Leu Glu Trp Val
        35                  40                  45

Ala Ser Ile His Ser Gly Gly Asp Thr Tyr Tyr Arg Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Thr Tyr Tyr Cys
                85                  90                  95

Ala Arg Gly Arg Thr Pro Thr Gly Tyr Tyr Phe Asp His Trp Gly Gln
            100                 105                 110

Gly Thr Met Val Thr Val Ser Ser
        115                 120

<210> SEQ ID NO 22
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 22

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Glu Gly Ile His Asn Gly
            20                  25                  30

Leu Ala Trp Tyr Gln Gln Lys Pro Gly Lys Ala Pro Lys Arg Leu Ile
        35                  40                  45

Tyr Asn Ala Asn Ser Leu His Ser Arg Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Gln Gln Tyr Tyr Asp Tyr Pro Leu
                85                  90                  95

Thr Phe Gly Gln Gly Thr Lys Leu Glu Ile Lys
            100                 105
```

<210> SEQ ID NO 23
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 23

```
Glu Val Gln Leu Val Glu Ser Gly Gly Val Val Gln Pro Gly Gly
1               5                   10                  15

Ser Leu Arg Leu Ser Cys Ala Pro Ser Gly Phe Thr Phe Ser Asn Tyr
            20                  25                  30

Gly Met Ala Trp Val Arg Gln Ala Pro Gly Lys Gly Leu Glu Trp Val
        35                  40                  45

Ser Ser Ile His Ser Gly Gly Asp Thr Tyr Tyr Ala Asp Ser Val
50                  55                  60

Lys Gly Arg Phe Thr Ile Ser Arg Asp Asn Ser Lys Asn Ser Leu Tyr
65                  70                  75                  80

Leu Gln Met Asn Ser Leu Arg Thr Glu Asp Thr Ala Leu Tyr Tyr Cys
                85                  90                  95

Ala Arg Gly Arg Thr Pro Thr Gly Tyr Tyr Phe Asp His Trp Gly Gln
            100                 105                 110

Gly Thr Met Val Thr Val Ser Ser
        115                 120
```

<210> SEQ ID NO 24
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 24

```
Glu Ile Val Met Thr Gln Ser Pro Ala Thr Leu Ser Val Ser Pro Gly
1               5                   10                  15

Glu Arg Ala Thr Leu Ser Cys Arg Ala Ser Glu Gly Ile His Asn Gly
            20                  25                  30

Leu Ala Trp Tyr Gln Gln Lys Pro Gly Gln Ala Pro Arg Leu Leu Ile
        35                  40                  45

Tyr Asn Ala Asn Ser Leu His Ser Gly Ile Pro Ala Arg Phe Ser Gly
50                  55                  60
```

Ser Gly Ser Gly Thr Glu Phe Thr Leu Thr Ile Ser Ser Leu Gln Ser
65                  70                  75                  80

Glu Asp Phe Ala Val Tyr Phe Cys Gln Gln Tyr Tyr Asp Tyr Pro Leu
                85                  90                  95

Thr Phe Gly Gln Gly Thr Lys Leu Glu Ile Lys
            100                 105

<210> SEQ ID NO 25
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 25

Asp Ile Gln Met Thr Gln Ser Pro Ser Ser Leu Ser Ala Ser Val Gly
1               5                   10                  15

Asp Arg Val Thr Ile Thr Cys Arg Ala Ser Glu Gly Ile His Asp Gly
            20                  25                  30

Leu Ala Trp Tyr Gln Gln Lys Pro Gly Lys Val Pro Lys Leu Leu Ile
        35                  40                  45

Tyr Asn Ala Asn Ser Leu His Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Val Ala Thr Tyr Phe Cys Gln Gln Tyr Tyr Asp Tyr Pro Leu
                85                  90                  95

Thr Phe Gly Gln Gly Thr Lys Leu Glu Ile Lys
            100                 105

<210> SEQ ID NO 26
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 26

Asp Ile Gln Met Thr Gln Ser Pro Ser Ser Leu Ser Ala Ser Val Gly
1               5                   10                  15

Asp Arg Val Thr Ile Thr Cys Arg Ala Ser Glu Gly Ile His Ser Gly
            20                  25                  30

Leu Ala Trp Tyr Gln Gln Lys Pro Gly Lys Val Pro Lys Leu Leu Ile
        35                  40                  45

Tyr Asn Ala Asn Ser Leu His Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Val Ala Thr Tyr Phe Cys Gln Gln Tyr Tyr Asp Tyr Pro Leu
                85                  90                  95

Thr Phe Gly Gln Gly Thr Lys Leu Glu Ile Lys
            100                 105

<210> SEQ ID NO 27
<211> LENGTH: 107
<212> TYPE: PRT
<213> ORGANISM: Artificial Sequence

```
<220> FEATURE:
<223> OTHER INFORMATION: Description of Artificial Sequence: Synthetic
      polypeptide

<400> SEQUENCE: 27

Asp Ile Gln Met Thr Gln Ser Pro Ser Ser Leu Ser Ala Ser Val Gly
1               5                   10                  15

Asp Arg Val Thr Ile Thr Cys Arg Ala Ser Glu Gly Ile His Thr Gly
            20                  25                  30

Leu Ala Trp Tyr Gln Gln Lys Pro Gly Lys Val Pro Lys Leu Leu Ile
        35                  40                  45

Tyr Asn Ala Asn Ser Leu His Ser Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Val Ala Thr Tyr Phe Cys Gln Gln Tyr Tyr Asp Tyr Pro Leu
                85                  90                  95

Thr Phe Gly Gln Gly Thr Lys Leu Glu Ile Lys
            100                 105

<210> SEQ ID NO 28
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 28

Asp Ile Gln Met Thr Gln Ser Pro Ser Ser Leu Ser Ala Ser Val Gly
1               5                   10                  15

Asp Arg Val Thr Ile Thr Cys Arg Ala Ser Glu Gly Ile His Leu Gly
            20                  25                  30

Leu Ala Trp Tyr Gln Gln Lys Pro Gly Lys Val Pro Lys Leu Leu Ile
        35                  40                  45

Tyr Asn Ala Asn Ser Leu His Ser Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Val Ala Thr Tyr Phe Cys Gln Gln Tyr Tyr Asp Tyr Pro Leu
                85                  90                  95

Thr Phe Gly Gln Gly Thr Lys Leu Glu Ile Lys
            100                 105

<210> SEQ ID NO 29
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Gly Phe Thr Phe Ser Asn Tyr Gly Met Ala
1               5                   10

<210> SEQ ID NO 30
<211> LENGTH: 11
<212> TYPE: PRT
<213> ORGANISM: Artificial Sequence
<220> FEATURE:
```

```
<223> OTHER INFORMATION: Description of Artificial Sequence: Synthetic
      peptide
<220> FEATURE:
<221> NAME/KEY: MOD_RES
<222> LOCATION: (8)..(8)
<223> OTHER INFORMATION: Any amino acid

<400> SEQUENCE: 30

Arg Ala Ser Glu Gly Ile His Xaa Gly Leu Ala
1               5                   10
```

FLT3 AGONIST ANTIBODIES AND USES THEREOF

CROSS REFERENCE

This application claims the benefit of U.S. Provisional Patent Application No. 62/781,213 filed on Dec. 18, 2018, all of which is incorporated by reference herein in its entirety.

SEQUENCE LISTING

The instant application contains a Sequence Listing which has been submitted electronically in ASCII format and is hereby incorporated by reference in its entirety. Said ASCII copy, created on Jun. 10, 2021, is named 01-3433-US-2_SL.txt and is 21,336 bytes in size.

BACKGROUND

FMS-like tyrosine kinase 3 (FLT3), also known as CD135, is a class III receptor tyrosine kinase expressed on hematopoietic stem cells, mature dendritic cells (DCs), and DC progenitors. FLT3 signaling via its ligand, FLT3 ligand (FTL3L) leads to expansion and differentiation of these cells. Mutations in this receptor uncouple cellular proliferation from ligand signaling and are associated with pathological neoplasms, particularly acute myeloid leukemia (AML). Conversely, agonism of FLT3 via exogenous soluble FLT3L treatment is currently under investigation in the clinic for solid tumor therapy, where its DC-expanding properties serve as an adjuvant for peptide vaccination therapy and to boost anti-tumor immune responses in combination with immuno-oncology and radiation therapies. However, FLT3L therapy suffers from limited pharmacokinetic availability and complex dosing requirements.

SUMMARY

Described herein is the development of an FLT3 agonist antibody which induces expansion and differentiation of DCs and their progenitors, improving tumor antigen presentation while overcoming the ligand's limited bio-availability. These antibodies are useful in methods of treating cancers.

An aspect described herein comprises a recombinant antibody or antigen binding fragment thereof that binds FMS like tyrosine kinase 3 (FLT3), wherein the recombinant antibody or antigen binding fragment thereof comprises: a variable region heavy chain complementarity determining region 1 (VH-CDR1) comprising the amino acid sequence set forth in SEQ ID NO: 1 (GFTFSNY); 2 (NYGMA); or 29 (GFTFSNYGMA); a variable region heavy chain complementarity determining region 2 (VH-CDR2) comprising the amino acid sequence set forth in SEQ ID NO: 3 (HSGGGD) or 4 (SIHSGGGDTYYRDSVKG); a variable region heavy chain complementarity determining region 3 (VH-CDR3) comprising the amino acid sequence set forth in SEQ ID NO: 5 (GRTPTGYYFDH); a variable region light chain complementarity determining region 1 (VL-CDR1) comprising the amino acid sequence set forth in any one of SEQ ID NOs: 6 to 10 (RASEGIHIXGLA); a variable region light chain complementarity determining region 2 (VL-CDR2) comprising the amino acid sequence set forth in SEQ ID NO: 10 (NANSLHS); and a variable region light chain complementarity determining region 3 (VL-CDR3) comprising the amino acid sequence set forth in any one of SEQ ID NO: 11 (QQYYDYPLT); wherein X is any amino acid residue. In some embodiments, the VL-CDR1 comprises an amino acid sequence selected from the list consisting of: SEQ ID NO: 7 (RASEGIHDGLA); SEQ ID NO: 8 (RASEGIHSGLA); SEQ ID NO: 9 (RASEGIHTGLA); and SEQ ID NO: 10 (RASEGIHLGLA). In some embodiments, the VL-CDR1 comprises the amino acid sequence set forth in SEQ ID NO:8 (RASEGIHSGLA). In some embodiments, the recombinant antibody or antigen binding fragment thereof comprises: an immunoglobulin heavy chain variable region (VH) sequence comprising an amino acid sequence which is at least about 90%, 95%, 97%, 98%, or 99%, or which is 100% identical to the amino acid sequence set forth in any one of SEQ ID NOs: 15, 17, 19, 21, and 23; and an immunoglobulin light chain variable region (VL) sequence comprising an amino acid sequence which is at least about 90%, 95%, 97%, 98%, or 99%, or which is 100% identical to the amino acid sequence set forth in any one of SEQ ID NOs: 16, 18, 20, 22, 24, 25, 26, 27, and 28. In some embodiments, the immunoglobulin heavy chain variable region (VH) comprises an amino acid sequence which is at least about 90%, 95%, 97%, 98%, or 99%, or which is 100% identical to the amino acid sequence set forth in SEQ ID NO: 15; and the immunoglobulin light chain variable region (VL) comprises an amino acid sequence which is at least about 90%, 95%, 97%, 98%, or 99%, or which is 100% identical to the amino acid sequence set forth in SEQ ID NO: 16. In some embodiments, the immunoglobulin heavy chain variable region (VH) comprises an amino acid sequence which is at least about 90%, 95%, 97%, 98%, or 99%, or which is 100% identical to the amino acid sequence set forth in SEQ ID NO: 15; and the immunoglobulin light chain variable region (VL) comprises an amino acid sequence which is at least about 90%, 95%, 97%, 98%, or 99%, or which is 100% identical to the amino acid sequence set forth in SEQ ID NO: 26. In some embodiments, the recombinant antibody or antigen binding fragment thereof is chimeric or humanized. In some embodiments, the recombinant antibody or antigen binding fragment thereof is an IgG antibody. In some embodiments, the recombinant antibody or antigen binding fragment thereof comprises one or more mutations to reduce one or more effector functions of the recombinant antibody or antigen binding fragment thereof. In some embodiments, a heavy chain constant region of the recombinant antibody or antigen binding fragment thereof comprises an IGg4 heavy chain constant region comprising any of the following amino acid modifications or set of modifications selected from: N434A, N434H, T307A/E380A/N434A, M252Y/S254T/T256E, 433K/434F/436H, T250Q, T250F, M428L, M428F, T250Q/M428L, N434S, V308W, V308Y, V308F, M252Y/M428L, D259I/V308F, M428L/V308F, Q311V/N434S, T307Q/N434A, E258F/V427T, S228P, L235E, S228P/L235E/R409K, S228P/L235E, K370Q, K370E, deletion of G446, deletion of K447, and any combination thereof of IgG4 modifications according to the EU numbering system. In some embodiments, the recombinant antibody or antigen binding fragment thereof comprises a Fab, F(ab)2, a single-domain antibody, or a single chain variable fragment (scFv). In some embodiments, the recombinant antibody or antigen binding fragment thereof increases the amount of dendritic cells or hematologic dendritic cell precursors when contacted with human peripheral blood mononuclear cells and/or bone marrow derived cells. In some embodiments, the EC50 for the increase in the amount of dendritic cells or hematologic dendritic cell precursors is less than about 200 picomolar (pM). In some embodiments, the recombinant antibody or antigen binding fragment thereof increases STAT5 expression in a cell line expressing FLT3. In some embodiments, the EC50 for the increase of STAT5 expression in the cell line expressing FLT3 is equal to or less than the EC50 for an increase of STAT5 expression in the cell line expressing FLT3 induced by human FLT3 ligand. In some embodiments, the recombinant antibody or antigen binding fragment thereof comprises an immunomodulating moiety. In some embodiments, the immunomodulating moiety is a stimulator of interferon genes protein (STING) agonist. In some embodiments, described herein is a pharmaceutical composition comprising the recombinant antibody or antigen binding fragment thereof described herein and a pharmaceutically acceptable excipient, carrier, or diluent. In some embodiments, the pharmaceutical composition is formulated for intravenous administration. In some embodiments, the pharmaceutical composition is formulated for subcutaneous administration. In some embodiments, the pharmaceutical composition is formulated for intratumoral administration. In some embodiments, the recombinant antibody or antigen binding fragment thereof described herein or the pharmaceutical composition described herein are for use in treating cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, the recombinant antibody or antigen binding fragment thereof described herein or the pharmaceutical composition described herein are for use in treating cancer in an individual diagnosed with or suspected of being afflicted with cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, the recombinant antibody or antigen binding fragment thereof described herein or the pharmaceutical composition described herein are for use in expanding or differentiating populations of dendritic cells or hematologic dendritic cell precursors. In some embodiments, described herein is a method of expanding or differentiating populations of dendritic cells or hematologic dendritic cell precursors in an individual comprising administering the recombinant antibody or antigen binding fragment thereof described herein or the pharmaceutical composition described herein to an individual diagnosed with or suspected of being afflicted with cancer. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a method of recruiting and/or expanding dendritic cells or hematologic dendritic cell precursors to a tumor microenvironment in an individual afflicted with a tumor or cancer comprising administering an effective amount of the recombinant antibody or antigen binding fragment thereof described herein or the pharmaceutical composition described herein to the individual afflicted with the tumor or cancer. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a nucleic acid encoding the recombinant antibody or antigen binding fragment thereof described herein. In some embodiments, described herein is a cell comprising the nucleic acid described herein. In some embodiments, the cell is a eukaryotic cell. In some embodiments, the cell is a Chinese Hamster Ovary (CHO) cell. In some embodiments, described herein is a method of making a cancer treatment comprising incubating the cell described herein in a culture medium under conditions sufficient to secrete the recombinant antibody or antigen binding fragment thereof described herein into the culture medium. In some embodiments, the method of making a cancer treatment further comprises subjecting the culture medium to at least one purification step. In some embodiments, described herein is a method of making a cancer treatment comprising admixing the recombinant antibody or antigen binding fragment thereof described herein and a pharmaceutically acceptable excipient, carrier, or diluent. In some embodiments, described herein is a use of the recombinant antibody or antigen binding fragment thereof described herein or the pharmaceutical composition described herein in treating cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in treating a cancer in an individual diagnosed with or suspected of being afflicted with said cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in expanding or differentiating populations of dendritic cells or hematologic dendritic cell precursors. In some embodiments, described herein is a use of the recombinant antibody or antigen binding fragment thereof described herein or the pharmaceutical composition described herein in expanding or differentiating populations of dendritic cells or hematologic dendritic cell precursors in an individual. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a use of the recombinant antibody or antigen binding fragment thereof described herein or the pharmaceutical composition described herein in recruiting dendritic cells or hematologic dendritic cell precursors to a tumor microenvironment in an individual. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a use of the recombinant antibody or antigen binding fragment thereof described herein and a pharmaceutically acceptable excipient, carrier, or diluent in the manufacture of a medicament for treating a cancer treatment. In some embodiments, described herein is a use of the recombinant antibody or antigen binding fragment thereof described herein or the pharmaceutical composition described herein in the manufacture of a medicament for treating cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in the manufacture of a medicament for treating an individual diagnosed with or suspected of being afflicted with cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in the manufacture of a medicament for expanding or differentiating populations of dendritic cells or hematologic dendritic cell precursors. In some embodiments, described herein is a use of the recombinant antibody or antigen binding fragment thereof described herein or the pharmaceutical composition described herein in the manufacture of a medicament for expanding or differentiating populations of dendritic cells or hematologic dendritic cell precursors in an individual diagnosed with or suspected of being afflicted with cancer. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a use of the recombinant antibody or antigen binding fragment thereof described herein or the pharmaceutical composition described herein in the manufacture of a medicament for recruiting dendritic cells or hematologic dendritic cell precursors to a tumor microenvironment in an individual diagnosed with or suspected of being afflicted with cancer. In some embodiments, the dendritic cells or hematologic dendritic cell precursors comprise conventional dendritic cells subset cDC1, conventional dendritic cells subset cDC2, plasmacytoid dendritic cells, or any combination thereof.

Another aspect described herein comprises a recombinant antibody or antigen binding fragment thereof that binds FMS like tyrosine kinase 3 (FLT3), wherein the recombinant antibody or antigen binding fragment thereof comprises any one of: a variable region heavy chain complementarity determining region 1 (VH-CDR1) comprising the amino acid sequence set forth in SEQ ID NO: 1 (GFTFSNY); 2 (NYGMA); or 29 (GFTFSNYGMA); a variable region heavy chain complementarity determining region 2 (VH-CDR2) comprising the amino acid sequence set forth in SEQ ID NO: 3 (HSGGGD) or 4 (SIHSGGGDTYYRDSVKG); a variable region heavy chain complementarity determining region 3 (VH-CDR3) comprising the amino acid sequence set forth in SEQ ID NO: 5 (GRTPTGYYFDH); a variable region light chain complementarity determining region 1 (VL-CDR1) comprising the amino acid sequence set forth in any one of SEQ ID NOs: 6 to 10 (RASEGIHXGLA); a variable region light chain complementarity determining region 2 (VL-CDR2) comprising the amino acid sequence set forth in SEQ ID NO: 10 (NANSLHS); or a variable region light chain complementarity determining region 3 (VL-CDR3) comprising the amino acid sequence set forth in any one of SEQ ID NO: 11 (QQYYDYPLT); wherein X is any amino acid residue. In some embodiments, the VL-CDR1 comprises an amino acid sequence selected from the list consisting of: SEQ ID NO: 7 (RASEGIHDGLA); SEQ ID NO: 8 (RASEGIHSGLA); SEQ ID NO: 9 (RASEGIHTGLA); and SEQ ID NO: 10 (RASEGIHLGLA). In some embodiments, the VL-CDR1 comprises the amino acid sequence set forth in SEQ ID NO:8 (RASEGIHSGLA). In some embodiments, the recombinant antibody or antigen binding fragment thereof comprises: an immunoglobulin heavy chain variable region (VH) sequence comprising an amino acid sequence which is at least about 90%, 95%, 97%, 98%, or 99%, or which is 100% identical to the amino acid sequence set forth in any one of SEQ ID NOs: 15, 17, 19, 21, and 23; and an immunoglobulin light chain variable region (VL) sequence comprising an amino acid sequence which is at least about 90%, 95%, 97%, 98%, or 99%, or which is 100% identical to the amino acid sequence set forth in any one of SEQ ID NOs: 16, 18, 20, 22, 24, 25, 26, 27, and 28. In some embodiments, the immunoglobulin heavy chain variable region (VH) comprises an amino acid sequence which is at least about 90%, 95%, 97%, 98%, or 99%, or which is 100% identical to the amino acid sequence set forth in SEQ ID NO: 15; and the immunoglobulin light chain variable region (VL) comprises an amino acid sequence which is at least about 90%, 95%, 97%, 98%, or 99%, or which is 100% identical to the amino acid sequence set forth in SEQ ID NO: 16. In some embodiments, the immunoglobulin heavy chain variable region (VH) comprises an amino acid sequence which is at least about 90%, 95%, 97%, 98%, or 99%, or which is 100% identical to the amino acid sequence set forth in SEQ ID NO: 15; and the immunoglobulin light chain variable region (VL) comprises an amino acid sequence which is at least about 90%, 95%, 97%, 98%, or 99%, or which is 100% identical to the amino acid sequence set forth in SEQ ID NO: 26. In some embodiments, the recombinant antibody or antigen binding fragment thereof is chimeric or humanized. In some embodiments, the recombinant antibody or antigen binding fragment thereof is an IgG antibody. In some embodiments, the recombinant antibody or antigen binding fragment thereof comprises one or more mutations to reduce one or more effector functions of the recombinant antibody or antigen binding fragment thereof. In some embodiments, a heavy chain constant region of the recombinant antibody or antigen binding fragment thereof comprises an IGg4 heavy chain constant region comprising any of the following amino acid modifications or set of modifications selected from: N434A, N434H, T307A/E380A/N434A, M252Y/S254T/T256E, 433K/434F/436H, T250Q, T250F, M428L, M428F, T250Q/M428L, N434S, V308W, V308Y, V308F, M252Y/M428L, D259I/V308F, M428L/V308F, Q311V/N434S, T307Q/N434A, E258F/V427T, S228P, L235E, S228P/L235E/R409K, S228P/L235E, K370Q, K370E, deletion of G446, deletion of K447, and any combination thereof of IgG4 modifications according to the EU numbering system. In some embodiments, the recombinant antibody or antigen binding fragment thereof comprises a Fab, F(ab)2, a single-domain antibody, or a single chain variable fragment (scFv). In some embodiments, the recombinant antibody or antigen binding fragment thereof increases the amount of dendritic cells or hematologic dendritic cell precursors when contacted with human peripheral blood mononuclear cells and/or bone marrow derived cells. In some embodiments, the EC50 for the increase in the amount of dendritic cells or hematologic dendritic cell precursors is less than about 200 picomolar (pM). In some embodiments, the recombinant antibody or antigen binding fragment thereof increases STAT5 expression in a cell line expressing FLT3. In some embodiments, the EC50 for the increase of STAT5 expression in the cell line expressing FLT3 is less than the EC50 for an increase of STAT5 expression in the cell line expressing FLT3 induced by human FLT3 ligand. In some embodiments, the recombinant antibody or antigen binding fragment thereof comprises an immunomodulating moiety. In some embodiments, the immunomodulating moiety is a stimulator of interferon genes protein (STING) agonist. In some embodiments, described herein is a pharmaceutical composition comprising the recombinant antibody or antigen binding fragment thereof described herein and a pharmaceutically acceptable excipient, carrier, or diluent. In some embodiments, the pharmaceutical composition is formulated for intravenous administration. In some embodiments, the pharmaceutical composition is formulated for subcutaneous administration. In some embodiments, the pharmaceutical composition is formulated for intratumoral administration. In some embodiments, the recombinant antibody or antigen binding fragment thereof described herein or the pharmaceutical composition described herein are for use in treating cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, the recombinant antibody or antigen binding fragment thereof described herein or the pharmaceutical composition described herein are for use in treating cancer in an individual diagnosed with or suspected of being afflicted with cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, the recombinant antibody or antigen binding fragment thereof described herein or the pharmaceutical composition described herein are for use in expanding or differentiating populations of dendritic cells or hematologic dendritic cell precursors. In some embodiments, described herein is a method of expanding or differentiating populations of dendritic cells or hematologic dendritic cell precursors in an individual comprising administering the recombinant antibody or antigen binding fragment thereof described herein or the pharmaceutical composition described herein to an individual diagnosed with or suspected of being afflicted with cancer. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a method of recruiting dendritic cells or hematologic dendritic cell precursors to a tumor microenvironment in an individual comprising administering an effective amount of the recombinant antibody or antigen binding fragment thereof described herein or the pharmaceutical composition described herein to an individual diagnosed with or suspected of being afflicted with cancer. In some embodiments, the dendritic cells or hematologic dendritic cell precursors comprise conventional dendritic cells subset cDC1, conventional dendritic cells subset cDC2, plasmacytoid dendritic cells, or any combination thereof, when administered to an individual. In some embodiments, described herein is a nucleic acid encoding the recombinant antibody or antigen binding fragment thereof described herein. In some embodiments, described herein is a cell comprising the nucleic acid described herein. In some embodiments, the cell is a eukaryotic cell. In some embodiments, the cell is a Chinese Hamster Ovary (CHO) cell. In some embodiments, described herein is a method of making a cancer treatment comprising incubating the cell described herein in a culture medium under conditions sufficient to secrete the recombinant antibody or antigen binding fragment thereof described herein into the culture medium. In some embodiments, the method of making a cancer treatment further comprises subjecting the culture medium to at least one purification step. In some embodiments, described herein is a method of making a cancer treatment comprising admixing the recombinant antibody or antigen binding fragment thereof described herein and a pharmaceutically acceptable excipient, carrier, or diluent. In some embodiments, described herein is a use of the recombinant antibody or antigen binding fragment thereof described herein or the pharmaceutical composition described herein in treating cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in treating a cancer in an individual diagnosed with or suspected of being afflicted with said cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in expanding or differentiating populations of dendritic cells or hematologic dendritic cell precursors. In some embodiments, described herein is a use of the recombinant antibody or antigen binding fragment thereof described herein or the pharmaceutical composition described herein in expanding or differentiating populations of dendritic cells or hematologic dendritic cell precursors in an individual. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a use of the recombinant antibody or antigen binding fragment thereof described herein or the pharmaceutical composition described herein in recruiting dendritic cells or hematologic dendritic cell precursors to a tumor microenvironment in an individual. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a use of the recombinant antibody or antigen binding fragment thereof described herein and a pharmaceutically acceptable excipient, carrier, or diluent in the manufacture of a medicament for treating a cancer treatment. In some embodiments, described herein is a use of the recombinant antibody or antigen binding fragment thereof described herein or the pharmaceutical composition described herein in the manufacture of a medicament for treating cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in the manufacture of a medicament for treating an individual diagnosed with or suspected of being afflicted with cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in the manufacture of a medicament for expanding or differentiating populations of dendritic cells or hematologic dendritic cell precursors. In some embodiments, described herein is a use of the recombinant antibody or antigen binding fragment thereof described herein or the pharmaceutical composition described herein in the manufacture of a medicament for expanding or differentiating populations of dendritic cells or hematologic dendritic cell precursors in an individual diagnosed with or suspected of being afflicted with cancer. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a use of the recombinant antibody or antigen binding fragment thereof described herein or the pharmaceutical composition described herein in the manufacture of a medicament for recruiting dendritic cells or hematologic dendritic cell precursors to a tumor microenvironment in an individual diagnosed with or suspected of being afflicted with cancer. In some embodiments, the dendritic cells or hematologic dendritic cell precursors comprise conventional dendritic cells subset cDC1, conventional dendritic cells subset cDC2, plasmacytoid dendritic cells, or any combination thereof.

Another aspect described herein comprises a recombinant antibody or antigen binding fragment thereof that specifically binds FMS like tyrosine kinase 3 (FLT3) comprising: an immunoglobulin heavy chain variable region (VH) sequence comprising an amino acid sequence which is at least about 90%, 95%, 97%, 98%, or 99%, or which is 100% identical to the amino acid sequence set forth in any one of SEQ ID NOs: 15, 17, 19, 21, and 23; and an immunoglobulin light chain variable region (VL) sequence comprising an amino acid sequence which is at least about 90%, 95%, 97%, 98%, or 99%, or which is 100% identical to the amino acid sequence set forth in any one of SEQ ID NOs: 16, 18, 20, 22, 24, 26, 27, and 28. In some embodiments, the immunoglobulin heavy chain variable region (VH) comprises an amino acid sequence which is at least about 90%, 95%, 97%, 98%, or 99%, or which is 100% identical to the amino acid sequence set forth in SEQ ID NO: 15; and the immunoglobulin light chain variable region (VL) comprises an amino acid sequence which is at least about 90%, 95%, 97%, 98%, or 99%, or which is 100% identical to the amino acid sequence set forth in SEQ ID NO: 16. In some embodiments, the immunoglobulin heavy chain variable region (VH) comprises an amino acid sequence which is at least about 90%, 95%, 97%, 98%, or 99%, or which is 100% identical to the amino acid sequence set forth in SEQ ID NO: 15; and the immunoglobulin light chain variable region (VL) comprises an amino acid sequence which is at least about 90%, 95%, 97%, 98%, or 99%, or which is 100% identical to the amino acid sequence set forth in SEQ ID NO: 26. In some embodiments, the recombinant antibody or antigen binding fragment thereof is chimeric or humanized. In some embodiments, the recombinant antibody or antigen binding fragment thereof is an IgG antibody. In some embodiments, the recombinant antibody or antigen binding fragment thereof comprises one or more mutations to reduce one or more effector functions of the recombinant antibody or antigen binding fragment thereof. In some embodiments, a heavy chain constant region of the recombinant antibody or antigen binding fragment thereof comprises an IGg4 heavy chain constant region comprising any of the following amino acid modifications or set of modifications selected from: N434A, N434H, T307A/E380A/N434A, M252Y/S254T/T256E, 433K/434F/436H, T250Q, T250F, M428L, M428F, T250Q/ M428L, N434S, V308W, V308Y, V308F, M252Y/M428L, D259I/V308F, M428L/V308F, Q311V/N434S, T307Q/ N434A, E258F/V427T, S228P, L235E, S228P/L235E/ R409K, S228P/L235E, K370Q, K370E, deletion of G446, deletion of K447, and any combination thereof of IgG4 modifications according to the EU numbering system. In some embodiments, the recombinant antibody or antigen binding fragment thereof comprises a Fab, F(ab)2, a single-domain antibody, or a single chain variable fragment (scFv). In some embodiments, the recombinant antibody or antigen binding fragment thereof increases the amount of dendritic cells or hematologic dendritic cell precursors when contacted with human peripheral blood mononuclear cells and/or bone marrow derived cells. In some embodiments, the EC50 for the increase in the amount of dendritic cells or hematologic dendritic cell precursors is less than about 200 picomolar (pM). In some embodiments, the recombinant antibody or antigen binding fragment thereof increases STAT5 expression in a cell line expressing FLT3. In some embodiments, the EC50 for the increase of STAT5 expression in the cell line expressing FLT3 is less than the EC50 for an increase of STAT5 expression in the cell line expressing FLT3 induced by human FLT3 ligand. In some embodiments, the recombinant antibody or antigen binding fragment thereof comprises an immunomodulating moiety. In some embodiments, the immunomodulating moiety is a stimulator of interferon genes protein (STING) agonist. In some embodiments, described herein is a pharmaceutical composition comprising the recombinant antibody or antigen binding fragment thereof described herein and a pharmaceutically acceptable excipient, carrier, or diluent. In some embodiments, the pharmaceutical composition is formulated for intravenous administration. In some embodiments, the pharmaceutical composition is formulated for subcutaneous administration. In some embodiments, the pharmaceutical composition is formulated for intratumoral administration. In some embodiments, the recombinant antibody or antigen binding fragment thereof described herein or the pharmaceutical composition described herein are for use in treating cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, the recombinant antibody or antigen binding fragment thereof described herein or the pharmaceutical composition described herein are for use in treating cancer in an individual diagnosed with or suspected of being afflicted with cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, the recombinant antibody or antigen binding fragment thereof described herein or the pharmaceutical composition described herein are for use in expanding or differentiating populations of dendritic cells or hematologic dendritic cell precursors. In some embodiments, described herein is a method of expanding, or differentiating populations of dendritic cells or hematologic dendritic cell precursors in an individual comprising administering the recombinant antibody or antigen binding fragment thereof described herein or the pharmaceutical composition described herein to an individual diagnosed with or suspected of being afflicted with cancer. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a method of recruiting dendritic cells or hematologic dendritic cell precursors to a tumor microenvironment in an individual comprising administering an effective amount of the recombinant antibody or antigen binding fragment thereof described herein or the pharmaceutical composition described herein to an individual diagnosed with or suspected of being afflicted with cancer. In some embodiments, the dendritic cells or hematologic dendritic cell precursors comprise conventional dendritic cells subset cDC1, conventional dendritic cells subset cDC2, plasmacytoid dendritic cells, or any combination thereof, when administered to an individual. In some embodiments, described herein is a nucleic acid encoding the recombinant antibody or antigen binding fragment thereof described herein. In some embodiments, described herein is a cell comprising the nucleic acid described herein. In some embodiments, the cell is a eukaryotic cell. In some embodiments, the cell is a Chinese Hamster Ovary (CHO) cell. In some embodiments, described herein is a method of making a cancer treatment comprising incubating the cell described herein in a culture medium under conditions sufficient to secrete the recombinant antibody or antigen binding fragment thereof described herein into the culture medium. In some embodiments, the method of making a cancer treatment further comprises subjecting the culture medium to at least one purification step. In some embodiments, described herein is a method of making a cancer treatment comprising admixing the recombinant antibody or antigen binding fragment thereof described herein and a pharmaceutically acceptable excipient, carrier, or diluent. In some embodiments, described herein is a use of the recombinant antibody or antigen binding fragment thereof described herein or the pharmaceutical composition described herein in treating cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in treating a cancer in an individual diagnosed with or suspected of being afflicted with said cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in expanding or differentiating populations of dendritic cells or hematologic dendritic cell precursors. In some embodiments, described herein is a use of the recombinant antibody or antigen binding fragment thereof described herein or the pharmaceutical composition described herein in expanding or differentiating populations of dendritic cells or hematologic dendritic cell precursors in an individual. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a use of the recombinant antibody or antigen binding fragment thereof described herein or the pharmaceutical composition described herein in recruiting dendritic cells or hematologic dendritic cell precursors to a tumor microenvironment in an individual. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a use of the recombinant antibody or antigen binding fragment thereof described herein and a pharmaceutically acceptable excipient, carrier, or diluent in the manufacture of a medicament for treating a cancer treatment. In some embodiments, described herein is a use of the recombinant antibody or antigen binding fragment thereof described herein or the pharmaceutical composition described herein in the manufacture of a medicament for treating cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in the manufacture of a medicament for treating an individual diagnosed with or suspected of being afflicted with cancer. In some embodiments, the cancer comprises glioblastoma, pancreatic cancer, breast cancer, bladder cancer, kidney cancer, head and neck cancer, ovarian cancer, colon cancer, cervical cancer, prostate cancer, or lung cancer. In some embodiments, described herein is a use of the recombinant antibody or antigen binding fragment thereof described herein or the pharmaceutical composition described herein in the manufacture of a medicament for expanding or differentiating populations of dendritic cells or hematologic dendritic cell precursors. In some embodiments, described herein is a use of the recombinant antibody or antigen binding fragment thereof described herein or the pharmaceutical composition described herein in the manufacture of a medicament for expanding or differentiating populations of dendritic cells or hematologic dendritic cell precursors in an individual diagnosed with or suspected of being afflicted with cancer. In some embodiments, the dendritic cells or hematologic dendritic cell precursors comprise conventional dendritic cells subset cDC1, conventional dendritic cells subset cDC2, plasmacytoid dendritic cells, or any combination thereof. In some embodiments, described herein is a use of the recombinant antibody or antigen binding fragment thereof described herein or the pharmaceutical composition described herein in the manufacture of a medicament for recruiting dendritic cells or hematologic dendritic cell precursors to a tumor microenvironment in an individual diagnosed with or suspected of being afflicted with cancer. In some embodiments, the dendritic cells or hematologic dendritic cell precursors comprise conventional dendritic cells subset cDC1, conventional dendritic cells subset cDC2, plasmacytoid dendritic cells, or any combination thereof.

BRIEF DESCRIPTION OF THE DRAWINGS

The novel features described herein are set forth with particularity in the appended claims. A better understanding of the features and advantages of the features described herein will be obtained by reference to the following detailed description that sets forth illustrative examples, in which the principles of the features described herein are utilized, and the accompanying drawings of which:

DETAILED DESCRIPTION

Figure 1:
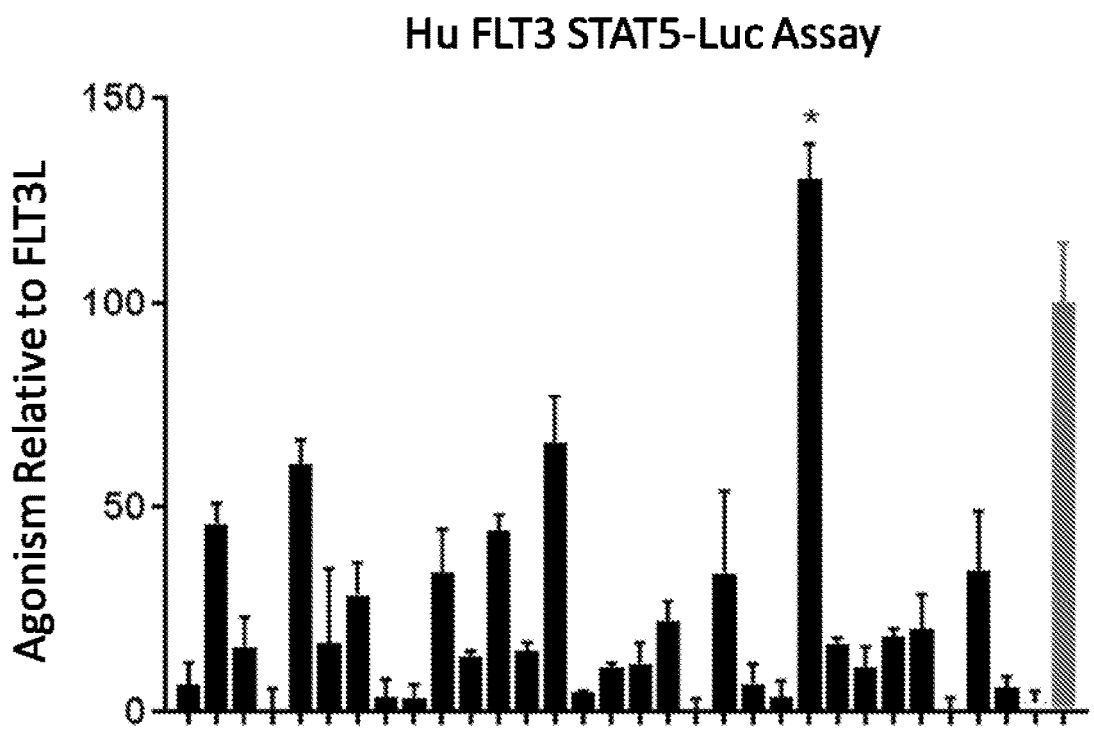
FIG. 1 shows activity of FLT3 antibodies in a single dose STAT5-Luciferase reporter assay. Values are normalized to FLT3L tested at 500 ng/ml (grey bar). The top clone (6B2 denoted by *) was carried forward for further screening.
Figure 2:
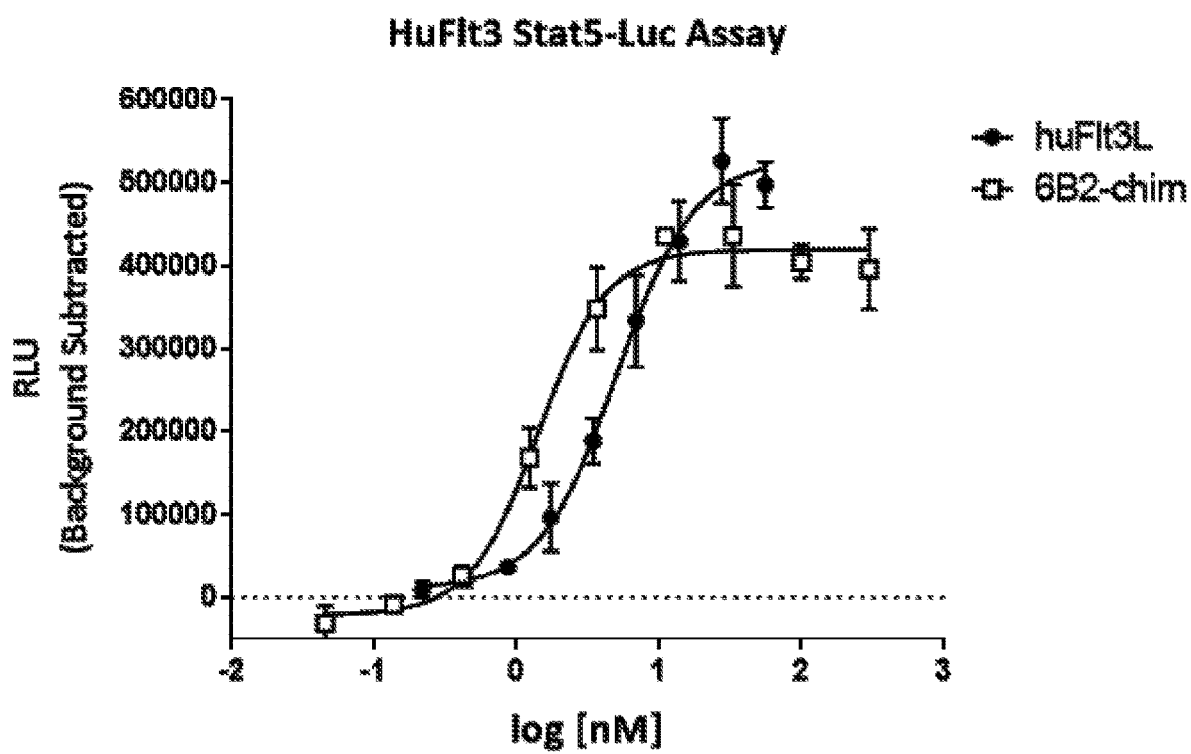
FIG. 2 shows a dose response curve for the top clone (6B2) highlighted in FIG. 1 in a STAT5-Luc reporter assay compared to human FLT3L.

In the following description, certain specific details are set forth in order to provide a thorough understanding of various embodiments. However, one skilled in the art will understand that the embodiments provided may be practiced without these details. Unless the context requires otherwise, throughout the specification and claims which follow, the word "comprise" and variations thereof, such as, "comprises" and "comprising" are to be construed in an open, inclusive sense, that is, as "including, but not limited to." As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. Further, headings provided herein are for convenience only and do not interpret the scope or meaning of the claimed embodiments.

As used herein the term "about" refers to an amount that is near the stated amount by 10% or less.

As used herein the term "individual," "patient," or "subject" refers to individuals diagnosed with, suspected of being afflicted with, or at-risk of developing at least one disease for which the described compositions and method are useful for treating. In certain embodiments, the individual is a mammal. In certain embodiments, the mammal is a mouse, rat, rabbit, dog, cat, horse, cow, sheep, pig, goat, llama, alpaca, or yak. In certain embodiments, the individual is a human.

The term "specific binding" or "binding" when used herein refers to binding mediated by one or more amino acid residues of the CDR of the antibody or fragment referred to, or one or more variable region amino acid residues of the antibody or fragment referred to. As used herein the term "contact" or "contacts" in reference to an antibody binding or being bound to a specific target refers to an amino acid residue of variable region or a CDR coming within 5, 4, 3 or fewer angstroms of the recited contacted residue. Contact includes hydrogen bonding, Van der Waal's interactions and salt bridge formation between an amino acid residue of the variable region or CDR of the antibody and the recited residue.

Among the provided antibodies are monoclonal antibodies, multispecific antibodies (for example, bispecific antibodies and polyreactive antibodies), and antibody fragments. The antibodies include antibody-conjugates and molecules comprising the antibodies, such as chimeric molecules. Thus, an antibody includes, but is not limited to, full-length and native antibodies, as well as fragments and portions thereof retaining the binding specificities thereof, such as any specific binding portion thereof including those having any number of, immunoglobulin classes and/or isotypes (e.g., IgG1, IgG2, IgG3, IgG4, IgA, IgD, IgE and IgM); and biologically relevant (antigen-binding) fragments or specific binding portions thereof, including but not limited to Fab, F(ab')2, Fv, and scFv (single chain or related entity). A monoclonal antibody is generally one within a composition of substantially homogeneous antibodies; thus, any individual antibodies comprised within the monoclonal antibody composition are identical except for possible naturally occurring mutations that may be present in minor amounts. The monoclonal antibody can comprise a human IgG1 constant region. The monoclonal antibody can comprise a human IgG4 constant region.

The term "antibody" herein is used in the broadest sense and includes polyclonal and monoclonal antibodies, including intact antibodies and functional (antigen-binding) antibody fragments thereof, including fragment antigen binding (Fab) fragments, F(ab')$_2$ fragments, Fab' fragments, Fv fragments, recombinant IgG (rIgG) fragments, single chain antibody fragments, including single chain variable fragments (sFv or scFv), and single domain antibodies (e.g., sdAb, sdFv, nanobody) fragments. The term encompasses genetically engineered and/or otherwise modified forms of immunoglobulins, such as intrabodies, peptibodies, chimeric antibodies, fully human antibodies, humanized antibodies, and heteroconjugate antibodies, multispecific, e.g., bispecific, antibodies, diabodies, triabodies, and tetrabodies, tandem di-scFv, tandem tri-scFv. Unless otherwise stated, the term "antibody" should be understood to encompass functional antibody fragments thereof. The term also encompasses intact or full-length antibodies, including antibodies of any class or sub-class, including IgG and sub-classes thereof, IgM, IgE, IgA, and IgD. The antibody can comprise a human IgG1 constant region. The antibody can comprise a human IgG4 constant region.

The terms "complementarity determining region," and "CDR," which are synonymous with "hypervariable region" or "HVR," are known in the art to refer to non-contiguous sequences of amino acids within antibody variable regions, which confer antigen specificity and/or binding affinity. In general, there are three CDRs in each heavy chain variable region (CDR-H1, CDR-H2, CDR-H3) and three CDRs in each light chain variable region (CDR-L1, CDR-L2, CDR-L3). "Framework regions" and "FR" are known in the art to refer to the non-CDR portions of the variable regions of the heavy and light chains. In general, there are four FRs in each full-length heavy chain variable region (FR-H1, FR-H2, FR-H3, and FR-H4), and four FRs in each full-length light chain variable region (FR-L1, FR-L2, FR-L3, and FR-L4). The precise amino acid sequence boundaries of a given CDR or FR can be readily determined using any of a number of well-known schemes, including those described by Kabat et al. (1991), "Sequences of Proteins of Immunological Interest," 5th Ed. Public Health Service, National Institutes of Health, Bethesda, Md. ("Kabat" numbering scheme), Al-Lazikani et al., (1997) JMB 273,927-948 ("Chothia" numbering scheme); MacCallum et al., *J. Mol. Biol.* 262:732-745 (1996), "Antibody-antigen interactions: Contact analysis and binding site topography," *J. Mol. Biol.* 262, 732-745." ("Contact" numbering scheme); Lefranc M P et al., "IMGT unique numbering for immunoglobulin and T cell receptor variable domains and Ig superfamily V-like domains," *Dev Comp Immunol,* 2003 January; 27(1):55-77 ("MGT" numbering scheme); Honegger A and Pldckthun A, "Yet another numbering scheme for immunoglobulin variable domains: an automatic modeling and analysis tool," *J Mol Biol,* 2001 Jun. 8; 309(3):657-70, ("Aho" numbering scheme); and Whitelegg N R and Rees A R, "WAM: an improved algorithm for modelling antibodies on the WEB," *Protein Eng.* 2000 December; 13(12):819-24 ("AbM" numbering scheme.

The boundaries of a given CDR or FR may vary depending on the scheme used for identification. For example, the Kabat scheme is based on structural alignments, while the Chothia scheme is based on structural information. Numbering for both the Kabat and Chothia schemes is based upon the most common antibody region sequence lengths, with insertions accommodated by insertion letters, for example, "30a," and deletions appearing in some antibodies. The two schemes place certain insertions and deletions ("indels") at different positions, resulting in differential numbering. The Contact scheme is based on analysis of complex crystal structures and is similar in many respects to the Chothia numbering scheme.

The term "variable region" or "variable domain" refers to the domain of an antibody heavy or light chain that is involved in binding the antibody to antigen. The variable domains of the heavy chain and light chain (VH and $V_L$, respectively) of a native antibody generally have similar structures, with each domain comprising four conserved framework regions (FRs) and three CDRs (See e.g., Kindt et al. Kuby *Immunology,* 6th ed., W.H. Freeman and Co., page 91(2007)). A single $V_H$ or $V_L$ domain may be sufficient to confer antigen-binding specificity. Furthermore, antibodies that bind a particular antigen may be isolated using a VH or VL domain from an antibody that binds the antigen to screen a library of complementary $V_L$ or VH domains, respectively (See e.g., Portolano et al., *J. Immunol.* 150:880-887 (1993); Clarkson et al., *Nature* 352:624-628 (1991)).

Among the provided antibodies are antibody fragments. An "antibody fragment" refers to a molecule other than an intact antibody that comprises a portion of an intact antibody that binds the antigen to which the intact antibody binds. Examples of antibody fragments include, but are not limited to, Fv, Fab, Fab', Fab'-SH, F(ab')$_2$; diabodies; linear antibodies; single-chain antibody molecules (e.g. scFv or sFv); and multispecific antibodies formed from antibody fragments. In particular embodiments, the antibodies are single-chain antibody fragments comprising a variable heavy chain region and/or a variable light chain region, such as scFvs.

Antibody fragments can be made by various techniques, including but not limited to proteolytic digestion of an intact antibody as well as production by recombinant host cells. In some embodiments, the antibodies are recombinantly-produced fragments, such as fragments comprising arrangements that do not occur naturally, such as those with two or more antibody regions or chains joined by synthetic linkers, e.g., polypeptide linkers, and/or those that are not produced by enzyme digestion of a naturally-occurring intact antibody. In some aspects, the antibody fragments are scFvs.

A "humanized" antibody is an antibody in which all or substantially all CDR amino acid residues are derived from non-human CDRs and all or substantially all FR amino acid residues are derived from human FRs. A humanized antibody optionally may include at least a portion of an antibody constant region derived from a human antibody. A "humanized form" of a non-human antibody refers to a variant of the non-human antibody that has undergone humanization, typically to reduce immunogenicity to humans, while retaining the specificity and affinity of the parental non-human antibody. In some embodiments, some FR residues in a humanized antibody are substituted with corresponding residues from a non-human antibody (e.g., the antibody from which the CDR residues are derived), e.g., to restore or improve antibody specificity or affinity.

Among the provided antibodies are human antibodies. A "human antibody" is an antibody with an amino acid sequence corresponding to that of an antibody produced by a human or a human cell, or non-human source that utilizes human antibody repertoires or other human antibody-encoding sequences, including human antibody libraries. The term excludes humanized forms of non-human antibodies comprising non-human antigen-binding regions, such as those in which all or substantially all CDRs are non-human.

Human antibodies may be prepared by administering an immunogen to a transgenic animal that has been modified to produce intact human antibodies or intact antibodies with human variable regions in response to antigenic challenge. Such animals typically contain all or a portion of the human immunoglobulin loci, which replace the endogenous immunoglobulin loci, or which are present extrachromosomally or integrated randomly into the animal's chromosomes. In such transgenic animals, the endogenous immunoglobulin loci have generally been inactivated. Human antibodies also may be derived from human antibody libraries, including phage display and cell-free libraries, containing antibody-encoding sequences derived from a human repertoire.

In some embodiments, the light or heavy chain variable domains of the engineered human antibody molecule may be fused to human light or heavy chain constant domains as appropriate. The human constant domains of the engineered human antibody molecule, where present, may be selected having regard to the proposed function of the antibody, in particular the lack of effector functions which may be required. For example, the heavy chain constant domains fused to the heavy chain variable region may be human IgA, IgG, or IgM domains. Preferably human IgG domains are used. Depending on the choice of human constant domains it may be necessary to alter specific amino acid residues to remove any undesirable effector function in order to produce an antibody of neutral isotype by, for example, using site directed or oligonucleotide directed mutagenesis. Light chain human constant domains which may be fused to the light chain variable region include human Lambda or human Kappa chains.

In some embodiments, analogues of human constant domains may alternatively be advantageously used. These include those constant domains containing one or more additional amino acids than the corresponding human domain or those constant domains wherein one or more existing amino acids of the corresponding human domain has been substituted, added, deleted or altered. Such domains may be obtained, for example, by oligonucleotide directed mutagenesis.

The terms "polypeptide" and "protein" are used interchangeably to refer to a polymer of amino acid residues, and are not limited to a minimum length. Polypeptides, including the provided antibodies and antibody chains and other peptides, e.g., linkers and binding peptides, may include amino acid residues including natural and/or non-natural amino acid residues. The terms also include post-expression modifications of the polypeptide, for example, glycosylation, sialylation, acetylation, phosphorylation, and the like. In some aspects, the polypeptides may contain modifications with respect to a native or natural sequence, as long as the protein maintains the desired activity. These modifications may be deliberate, as through site-directed mutagenesis, or may be accidental, such as through mutations of hosts which produce the proteins or errors due to PCR amplification.

Percent (%) sequence identity with respect to a reference polypeptide sequence is the percentage of amino acid residues in a candidate sequence that are identical with the amino acid residues in the reference polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are known for instance, using publicly available computer software such as BLAST, BLAST-2, ALIGN or Megalign (DNASTAR) software. Appropriate parameters for aligning sequences are able to be determined, including algorithms needed to achieve maximal alignment over the full length of the sequences being compared. For purposes herein, however, % amino acid sequence identity values are generated using the sequence comparison computer program ALIGN-2. The ALIGN-2 sequence comparison computer program was authored by Genentech, Inc., and the source code has been filed with user documentation in the U.S. Copyright Office, Washington D.C., 20559, where it is registered under U.S. Copyright Registration No. TXU510087. The ALIGN-2 program is publicly available from Genentech, Inc., South San Francisco, Calif., or may be compiled from the source code. The ALIGN-2 program should be compiled for use on a UNIX operating system, including digital UNIX V4.0D. All sequence comparison parameters are set by the ALIGN-2 program and do not vary.

In situations where ALIGN-2 is employed for amino acid sequence comparisons, the % amino acid sequence identity of a given amino acid sequence A to, with, or against a given amino acid sequence B (which can alternatively be phrased as a given amino acid sequence A that has or comprises a certain % amino acid sequence identity to, with, or against a given amino acid sequence B) is calculated as follows: 100 times the fraction X/Y, where X is the number of amino acid residues scored as identical matches by the sequence alignment program ALIGN-2 in that program's alignment of A and B, and where Y is the total number of amino acid residues in B. It will be appreciated that where the length of amino acid sequence A is not equal to the length of amino acid sequence B, the % amino acid sequence identity of A to B will not equal the % amino acid sequence identity of B to A. Unless specifically stated otherwise, all % amino acid sequence identity values used herein are obtained as described in the immediately preceding paragraph using the ALIGN-2 computer program.

In some embodiments, amino acid sequence variants of the antibodies provided herein are contemplated. A variant typically differs from a polypeptide specifically disclosed herein in one or more substitutions, deletions, additions and/or insertions. Such variants can be naturally occurring or can be synthetically generated, for example, by modifying one or more of the above polypeptide sequences of the invention and evaluating one or more biological activities of the polypeptide as described herein and/or using any of a number of known techniques. For example, it may be desirable to improve the binding affinity and/or other biological properties of the antibody Amino acid sequence variants of an antibody may be prepared by introducing appropriate modifications into the nucleotide sequence encoding the antibody, or by peptide synthesis. Such modifications include, for example, deletions from, and/or insertions into and/or substitutions of residues within the amino acid sequences of the antibody. Any combination of deletion, insertion, and substitution can be made to arrive at the final construct, provided that the final construct possesses the desired characteristics, e.g., antigen-binding.

In some embodiments, antibody variants having one or more amino acid substitutions are provided. Sites of interest for mutagenesis by substitution include the CDRs and FRs. Amino acid substitutions may be introduced into an antibody of interest and the products screened for a desired activity, e.g., retained/improved antigen binding, decreased immunogenicity, or improved ADCC or CDC.

In some embodiments, substitutions, insertions, or deletions may occur within one or more CDRs, wherein the substitutions, insertions, or deletions do not substantially reduce antibody binding to antigen. For example, conservative substitutions that do not substantially reduce binding affinity may be made in CDRs. Such alterations may be outside of CDR "hotspots". In some embodiments of the variant $V_H$ and $V_L$ sequences, each CDR is unaltered.

Alterations (e.g., substitutions) may be made in CDRs, e.g., to improve antibody affinity. Such alterations may be made in CDR encoding codons with a high mutation rate during somatic maturation (See e.g., Chowdhury, *Methods Mol. Biol.* 207:179-196 (2008)), and the resulting variant can be tested for binding affinity. Affinity maturation (e.g., using error-prone PCR, chain shuffling, randomization of CDRs, or oligonucleotide-directed mutagenesis) can be used to improve antibody affinity (See e.g., Hoogenboom et al. in *Methods in Molecular Biology* 178:1-37 (2001)). CDR residues involved in antigen binding may be specifically identified, e.g., using alanine scanning mutagenesis or modeling (See e.g., Cunningham and Wells *Science,* 244:1081-1085 (1989)). CDR-H3 and CDR-L3 in particular are often targeted. Alternatively, or additionally, a crystal structure of an antigen-antibody complex to identify contact points between the antibody and antigen. Such contact residues and neighboring residues may be targeted or eliminated as candidates for substitution. Variants may be screened to determine whether they contain the desired properties.

Amino acid sequence insertions and deletions include amino- and/or carboxyl-terminal fusions ranging in length from one residue to polypeptides containing a hundred or more residues, as well as intrasequence insertions and deletions of single or multiple amino acid residues. Examples of terminal insertions include an antibody with an N-terminal methionyl residue. Other insertional variants of the antibody molecule include the fusion to the N- or C-terminus of the antibody to an enzyme (e.g., for ADEPT) or a polypeptide which increases the serum half-life of the antibody. Examples of intrasequence insertion variants of the antibody molecules include an insertion of 3 amino acids in the light chain. Examples of terminal deletions include an antibody with a deletion of 7 or less amino acids at an end of the light chain.

In some embodiments, the antibodies are altered to increase or decrease their glycosylation (e.g., by altering the amino acid sequence such that one or more glycosylation sites are created or removed). A carbohydrate attached to an Fc region of an antibody may be altered. Native antibodies from mammalian cells typically comprise a branched, biantennary oligosaccharide attached by an N-linkage to $Asn_{297}$ of the CH2 domain of the Fc region (See e.g., Wright et al. *TIBTECH* 15:26-32 (1997)). The oligosaccharide can be various carbohydrates, e.g., mannose, N-acetyl glucosamine (GlcNAc), galactose, sialic acid, fucose attached to a GlcNAc in the stem of the biantennar oligosaccharide structure. Modifications of the oligosaccharide in an antibody can be made, for example, to create antibody variants with certain improved properties. Antibody glycosylation variants can have improved ADCC and/or CDC function. In some embodiments, antibody variants are provided having a carbohydrate structure that lacks fucose attached (directly or indirectly) to an Fc region. For example, the amount of fucose in such antibody may be from 1% to 80%, from 1% to 65%, from 5% to 65% or from 20% to 40%. The amount of fucose is determined by calculating the average amount of fucose within the sugar chain at $Asn_{297}$, relative to the sum of all glycostructures attached to $Asn_{297}$ (See e.g., WO 08/077546). $Asn_{297}$ refers to the asparagine residue located at about position 297 in the Fc region (EU numbering of Fc region residues; See e.g., Edelman et al. *Proc Natl Acad Sci USA*. 1969 May; 63(1):78-85). However, $Asn_{297}$ may also be located about ±3 amino acids upstream or downstream of position 297, i.e., between positions 294 and 300, due to minor sequence variations in antibodies. Such fucosylation variants can have improved ADCC function (See e.g., Okazaki et al. J. Mol. Biol. 336:1239-1249 (2004); and Yamane-Ohnuki et al. *Biotech. Bioeng.* 87: 614 (2004)). Cell lines, e.g., knockout cell lines and methods of their use can be used to produce defucosylated antibodies, e.g., Lec13 CHO cells deficient in protein fucosylation and alpha-1,6-fucosyltransferase gene (FUT8) knockout CHO cells (See e.g., Ripka et al. *Arch. Biochem. Biophys.* 249:533-545 (1986); Yamane-Ohnuki et al. *Biotech. Bioeng.* 87: 614 (2004); Kanda, Y. et al., *Biotechnol. Bioeng.*, 94(4):680-688 (2006)). Other antibody glycosylation variants are also included (See e.g., U.S. Pat. No. 6,602,684).

In some embodiments, one or more amino acid modifications may be introduced into the Fc region of an antibody provided herein, thereby generating an Fc region variant. An Fc region herein is a C-terminal region of an immunoglobulin heavy chain that contains at least a portion of the constant region. An Fc region includes native sequence Fc regions and variant Fc regions. The Fc region variant may comprise a human Fc region sequence (e.g., a human IgG1, IgG2, IgG3 or IgG4 Fc region) comprising an amino acid modification (e.g., a substitution) at one or more amino acid positions.

The phrase "effector functions" as used herein, is intended to include the functional capabilities imparted by an Fc-containing protein upon binding to an FcγR. Without being bound to any one theory, formation of an Fc/FcγR complex recruits a variety of effector cells to sites of bound antigen, typically resulting in diverse signaling events within the cells and important subsequent immune responses.

The phrase "antibody-dependent cell-mediated cytotoxicity" and "ADCC" as used herein refer to a cell-mediated reaction in which nonspecific cytotoxic cells that express FcRs (e.g. Natural Killer (NK) cells, neutrophils, and macrophages) recognize bound antibody on a target cell and subsequently cause lysis of the target cell. The primary cells for mediating ADCC, NK cells, express FcγRIII only, whereas monocytes express FcγRI, FcγRII and FcγRIII.

The phrase "antibody-dependent cellular phagocytosis" and "ADCP" as used herein refer to a process by which antibody-coated cells are internalized, either in whole or in part, by phagocytic immune cells (e.g., macrophages, neutrophils and dendritic cells) that bind to an immunoglobulin Fc region.

The phrase "complement-dependent cytotoxicity" or "CDC" refers to the ability of an antibody Fc region to trigger activation of complement resulting in formation of a membrane attack complex on the surface of a targeted cell.

In some embodiments, the antibodies of this disclosure comprise variants that possess some but not all effector functions, which make it a desirable candidate for applications in which the half-life of the antibody in vivo is important yet certain effector functions (such as complement and ADCC) are unnecessary or deleterious. In vitro and/or in vivo cytotoxicity assays can be conducted to confirm the reduction/depletion of CDC and/or ADCC activities. For example, Fc receptor (FcR) binding assays can be conducted to ensure that the antibody lacks FcγR binding (hence likely lacking ADCC activity) but retains FcRn binding ability. Non-limiting examples of in vitro assays to assess ADCC activity of a molecule of interest is described in U.S. Pat. Nos. 5,500,362 and 5,821,337. Alternatively, non-radioactive assays methods may be employed (e.g., ACTI™ and CytoTox 96® non-radioactive cytotoxicity assays). Useful effector cells for such assays include peripheral blood mononuclear cells (PBMC), monocytes, macrophages, and Natural Killer (NK) cells.

In some embodiments, the antibodies described herein can modulate an effector function as compared to an antibody comprising a wildtype Fc. This modulation may be a result of choice of Fc region (e.g., IgG4 possesses inherently lower effector function than IgG1). This modulation may be the result of introducing one or more variants to the Fc region (either an IgG1 or IgG4 Fc region). In some embodiments, the modulation is a modulation of ADCC and/or ADCP and/or CDC (complement-dependent cytotoxicity). In some embodiments the modulation is down-modulation or reduction in effect. In some embodiments, the modulation is of ADCC; and in some embodiments, the modulation is a down-modulation of ADCC. In some embodiments, the modulation is a down-modulation of ADCC and CDC. In some embodiments, the modulation is a down-modulation is ADCC only. In some embodiments, the modulation is a down-modulation of ADCC and CDC and/or ADCP. In some embodiments, the antibodies down-modulate or reduce ADCC/CDC and ADCP. In some embodiments, reduction or down-modulation of ADCC or CDC or ADCP induced by the antibody comprising the Fc variant, is a reduction to 0, 2.5, 5, 10, 20, 50 or 75% of the value observed for induction of ADCC, or CDC or ADCP, respectively, by an antibody comprising the wildtype Fc region. In some embodiments, the modulation of ADCC induced by the antibodies is a decrease in potency such that the EC50 of said Fc variant is approximately >10-fold reduced compared to an antibody comprising the wildtype Fc region. In some embodiments, the antibodies are devoid of any substantial ADCC and/or CDC and/or ADCP in the presence of human effector cells as compared to an antibody comprising the wildtype Fc region. In some embodiments, the antibodies exhibit a reduced, for example reduction by at least 20%, or strongly reduced, for example reduction by at least 50%, effector function, which could be a reduction in ADCC (down-modulation), CDC and/or ADCP.

In vitro and/or in vivo cytotoxicity assays can be conducted to confirm the reduction/depletion of CDC and/or ADCC activities. For example, Fc receptor (FcR) binding assays can be conducted to ensure that the antibody lacks FcγR binding (hence likely lacking ADCC activity) but retains FcRn binding ability.

The complement activation pathway is initiated by the binding of the first component of the complement system (C1q) to a molecule, an antibody for example, complexed with a cognate antigen. The binding properties of the different variants to C1q can be analyzed by an ELISA sandwich type immunoassay. The antibody concentration at the half maximum response determines the $EC_{50}$ value. This read-out is reported as relative difference to the reference standard measured on the same plate together with the coefficient of variation of sample and reference.

In some embodiments, the antibodies described herein exhibit decreased affinities to C1q relative to a corresponding wildtype antibody. In some embodiments, antibodies exhibit affinities for C1q receptor that are at least 2-fold, or at least 3-fold, or at least 5-fold, or at least 7-fold, or at least 10-fold, or at least 20-fold, or at least 30-fold, or at least 40-fold, or at least 50-fold, or at least 60-fold, or at least 70-fold, or at least 80-fold, or at least 90-fold, or at least 100-fold, or at least 200-fold less than the corresponding wildtype antibody.

In some embodiments, the antibodies described herein exhibit affinities for C1q that are at least 90%, at least 80%, at least 70%, at least 60%, at least 50%, at least 40%, at least 30%, at least 20%, at least 10%, or at least 5% less than that of the corresponding wildtype antibody. In some embodiments, the antibodies described herein exhibit affinities for C1q that are between about 100 nM to about 100 pM, or about 100 nM to about 10 µM, or about 100 nM to about 1 µM, or about 1 nM to about 100 µM, or about 10 nM to about 100 µM, or about 1 µM to about 100 µM, or about 10 µM to about 100 M. In some embodiments, the antibodies described herein exhibit affinities for C1q that are greater than 1 µM, greater than 5 µM, greater than 10 µM, greater than 25 µM, greater than 50 µM, or greater than 100 µM.

In some embodiments, the antibodies described herein exhibit decreased CDC activities as compared to the corresponding wildtype Fc antibody. In some embodiments, the antibodies described herein exhibit CDC activities that are at least 2-fold, or at least 3-fold, or at least 5-fold or at least 10-fold or at least 50-fold or at least 100-fold less than that of the corresponding wildtype antibody. In some embodiments, the antibodies described herein exhibit CDC activities that are reduced by at least 10%, or at least 20%, or by at least 30%), or by at least 40%, or by at least 50%, or by at least 60%, or by at least 70%, or by at least 80%, or by at least 90%, or by at least 100%, or by at least 200%, or by at least 300%, or by at least 400%, or by at least 500% relative to the corresponding wildtype antibody. In some embodiments, the antibodies described herein exhibit no detectable CDC activities. In some embodiments, the reduction and/or ablation of CDC activity may be attributed to the reduced affinity of the antibodies described herein for Fc ligands and/or receptors.

It is understood in the art that biological therapies may have adverse toxicity issues associated with the complex nature of directing the immune system to recognize and attack unwanted cells and/or targets. When the recognition and/or the targeting for attack do not take place where the treatment is required, consequences such as adverse toxicity may occur. For example, antibody staining of non-targeted tissues may be indicative of potential toxicity issues. In some embodiments, the antibodies described herein exhibit reduced staining of non-targeted tissues as compared to the corresponding wildtype antibody. In some embodiments, the antibodies described herein exhibit reduced staining of non-targeted tissues that are at least 2-fold, or at least 3-fold, or at least 5-fold, or at least 7-fold, or at least 10-fold, or at least 20-fold, or at least 30-fold, or at least 40-fold, or at least 50-fold, or at least 60-fold, or at least 70-fold, or at least 80-fold, or at least 90-fold, or at least 100-fold, or at least 200-fold less than that of to the corresponding wildtype antibody. In some embodiments, the antibodies described herein exhibit reduced staining of non-targeted tissues that are reduced by at least 10%, or at least 20%, or by at least 30%, or by at least 40%, or by at least 50%, or by at least 60%, or by at least 70%, or by at least 80%, or by at least 90%, or by at least 100%, or by at least 200%, or by at least 300%, or by at least 400%, or by at least 500% relative to the corresponding wildtype antibody.

In some embodiments, the antibodies described herein exhibit a reduced antibody related toxicity as compared to the corresponding wildtype antibody. In some embodiments, the antibodies described herein exhibit toxicities that are at least 2-fold, or at least 3-fold, or at least 5-fold, or at least 7-fold, or at least 10-fold, or at least 20-fold, or at least 30-fold, or at least 40-fold, or at least-50-fold, or at least 60-fold, or at least 70-fold, or at least 80-fold, or at least 90-fold, or at least 100-fold, or at least 200-fold less than that of the corresponding wildtype antibody. In some embodiments, the antibodies described herein exhibit toxicities that are reduced by at least 10%, or at least 20%, or by at least 30%, or by at least 40%, or by at least 50%, or by at least 60%, or by at least 70%), or by at least 80%, or by at least 90%, or by at least 100%, or by at least 200%, or by at least 300%, or by at least 400%, or by at least 500% relative to the corresponding wildtype antibody.

It is understood in the art that biological therapies may have as adverse effect thrombocyte aggregation. In vitro and in vivo assays could be used for measuring thrombocyte aggregation. In some embodiments, the antibodies described herein exhibit reduced thrombocyte aggregation in an in vitro assay compared to the corresponding wildtype antibody. In some embodiments, the antibodies described herein exhibit reduced thrombocyte aggregation in an in vitro assay that is at least 2-fold, or at least 3-fold, or at least 5-fold, or at least 7-fold, or at least 10-fold, or at least 20-fold, or at least 30-fold, or at least 40-fold, or at least 50-fold, or at least 60-fold, or at least 70-fold, or at least 80-fold, or at least 90-fold, or at least 100-fold, or at least 200-fold less than that of the corresponding wildtype antibody. In some embodiments, the antibodies described herein exhibit reduced thrombocyte aggregation in an in vitro assay that is reduced by at least 10%, or at least 20%, or by at least 30%, or by at least 40%, or by at least 50%, or by at least 60%, or by at least 70%, or by at least 80%, or by at least 90%, or by at least 100%, or by at least 200%, or by at least 300%, or by at least 400%, or by at least 500%) relative to the corresponding wildtype antibody.

In some embodiments, the antibodies described herein exhibit a reduced in vivo thrombocyte aggregation compared to the corresponding wildtype antibody. In some embodiments, the antibodies described herein exhibit reduced thrombocyte aggregation in an in vivo assay that is at least 2-fold, or at least 3-fold, or at least 5-fold, or at least 7-fold, or at least 10-fold, or at least 20-fold, or at least 30-fold, or at least 40-fold, or at least 50-fold, or at least 60-fold, or at least 70-fold, or at least 80-fold, or at least 90-fold, or at least 100-fold, or at least 200-fold less than that of the corresponding wildtype antibody. In some embodiments, the antibodies described herein exhibit reduced thrombocyte aggregation in an in vivo assay that is reduced by at least 10%, or at least 20%, or by at least 30%, or by at least 40%, or by at least 50%, or by at least 60%, or by at least 70%, or by at least 80%, or by at least 90%, or by at least 100%, or by at least 200%, or by at least 300%, or by at least 400%, or by at least 500% relative to the corresponding wildtype antibody.

In some embodiments, the antibodies described herein exhibit reduced platelet activation and/or platelet aggregation as compared to the corresponding wildtype antibody.

In some embodiments, the antibodies described herein target FLT3. In some embodiments, the antibodies described herein lack an Fc region (e.g., a (Fab')$_2$ fragment). In some embodiments, the antibodies described herein comprise mutated residues in or close to the N-glycosylation site. In some embodiments, the antibodies described herein have an amino acid modification or set of modifications selected from: N434A, N434H, T307A/E380A/N434A, M252Y/ S254T/T256E, 433K/434F/436H, T250Q, T250F, M428L, M428F, T250Q/M428L, N434S, V308W, V308Y, V308F, M252Y/M428L, D259I/V308F, M428L/V308F, Q311V/ N434S, T307Q/N434A, E258F/V427T, S228P, L235E, S228P/L235E/R409K, S228P/L235E, K370Q, K370E, deletion of G446, deletion of K447, and any combination thereof of IgG4 according to the EU numbering system. In some embodiments, the antibodies described herein comprise IgG4. In some embodiments, the antibodies comprise a modified IgG4 wherein an IgG2 (up to T260) is joined with the end of the IgG4 Fc.

Antibodies can have increased half-lives and improved binding to the neonatal Fc receptor (FcRn) (See e.g., US 2005/0014934). Such antibodies can comprise an Fc region with one or more substitutions therein which improve binding of the Fc region to FcRn, and include those with substitutions at one or more of Fc region residues: 238, 256, 265, 272, 286, 303, 305, 307, 311, 312, 317, 340, 356, 360, 362, 376, 378, 380, 382, 413, 424 or 434 according to the EU numbering system (See e.g., U.S. Pat. No. 7,371,826). Other examples of Fc region variants are also contemplated (See e.g., Duncan & Winter, *Nature* 322:738-40 (1988); U.S. Pat. Nos. 5,648,260 and 5,624,821; and WO94/29351).

In some embodiments, it may be desirable to create cysteine engineered antibodies, e.g., "thioMAbs," in which one or more residues of an antibody are substituted with cysteine residues. In some embodiments, the substituted residues occur at accessible sites of the antibody. Reactive thiol groups can be positioned at sites for conjugation to other moieties, such as drug moieties or linker drug moieties, to create an immunoconjugate. In some embodiments, any one or more of the following residues may be substituted with cysteine: V205 (Kabat numbering) of the light chain; A118 (EU numbering) of the heavy chain; and S400 (EU numbering) of the heavy chain Fc region.

In some embodiments, an antibody provided herein may be further modified to contain additional nonproteinaceous moieties that are known and available. The moieties suitable for derivatization of the antibody include but are not limited to water soluble polymers. Non-limiting examples of water soluble polymers include, but are not limited to, polyethylene glycol (PEG), copolymers of ethylene glycol/propylene glycol, carboxymethylcellulose, dextran, polyvinyl alcohol, polyvinyl pyrrolidone, poly-1,3-dioxolane, poly-1,3,6-trioxane, ethylene/maleic anhydride copolymer, polyaminoacids (either homopolymers or random copolymers), and dextran or poly(n vinyl pyrrolidone)polyethylene glycol, polypropylene glycol homopolymers, polypropylen oxide/ ethylene oxide co-polymers, polyoxyethylated polyols (e.g., glycerol), polyvinyl alcohol, and mixtures thereof. Polyethylene glycol propionaldehyde may have advantages in manufacturing due to its stability in water. The polymer may be of any molecular weight, and may be branched or unbranched. The number of polymers attached to the antibody may vary, and if two or more polymers are attached, they can be the same or different molecules.

The antibodies described herein can be encoded by a nucleic acid. A nucleic acid is a type of polynucleotide comprising two or more nucleotide bases. In certain embodiments, the nucleic acid is a component of a vector that can be used to transfer the polypeptide encoding polynucleotide into a cell. As used herein, the term "vector" refers to a nucleic acid molecule capable of transporting another nucleic acid to which it has been linked. One type of vector is a genomic integrated vector, or "integrated vector," which can become integrated into the chromosomal DNA of the host cell. Another type of vector is an "episomal" vector, e.g., a nucleic acid capable of extra-chromosomal replication. Vectors capable of directing the expression of genes to which they are operatively linked are referred to herein as "expression vectors." Suitable vectors comprise plasmids, bacterial artificial chromosomes, yeast artificial chromosomes, viral vectors and the like. In the expression vectors regulatory elements such as promoters, enhancers, polyadenylation signals for use in controlling transcription can be derived from mammalian, microbial, viral or insect genes. The ability to replicate in a host, usually conferred by an origin of replication, and a selection gene to facilitate recognition of transformants may additionally be incorporated. Vectors derived from viruses, such as lentiviruses, retroviruses, adenoviruses, adeno-associated viruses, and the like, may be employed. Plasmid vectors can be linearized for integration into a chromosomal location. Vectors can comprise sequences that direct site-specific integration into a defined location or restricted set of sites in the genome (e.g., AttP-AttB recombination). Additionally, vectors can comprise sequences derived from transposable elements.

As used herein, the terms "homologous," "homology," or "percent homology" when used herein to describe to an amino acid sequence or a nucleic acid sequence, relative to a reference sequence, can be determined using the formula described by Karlin and Altschul (Proc. Natl. Acad. Sci. USA 87: 2264-2268, 1990, modified as in Proc. Natl. Acad. Sci. USA 90:5873-5877, 1993). Such a formula is incorporated into the basic local alignment search tool (BLAST) programs of Altschul et al. (J. Mol. Biol. 215: 403-410, 1990). Percent homology of sequences can be determined using the most recent version of BLAST, as of the filing date of this application.

The nucleic acids encoding the antibodies described herein can be used to infect, transfect, transform, or otherwise render a suitable cell transgenic for the nucleic acid, thus enabling the production of antibodies for commercial or therapeutic uses. Standard cell lines and methods for the production of antibodies from a large-scale cell culture are known in the art. See e.g., Li et al., "Cell culture processes for monoclonal antibody production." Mabs. 2010 September-October; 2(5): 466-477. In certain embodiments, the cell is a Eukaryotic cell. In certain embodiments, the Eukaryotic cell is a mammalian cell. In certain embodiments, the mammalian cell is a cell line useful for producing antibodies is a Chines Hamster Ovary cell (CHO) cell, an NS0 murine myeloma cell, or a PER.C6® cell. In certain embodiments, the nucleic acid encoding the antibody is integrated into a genomic locus of a cell useful for producing antibodies. In certain embodiments, described herein is a method of making an antibody comprising culturing a cell comprising a nucleic acid encoding an antibody under conditions in vitro sufficient to allow production and secretion of said antibody.

In certain embodiments, described herein, is a master cell bank comprising: (a) a mammalian cell line comprising a nucleic acid encoding an antibody described herein integrated at a genomic location; and (b) a cryoprotectant. In certain embodiments, the cryoprotectant comprises glycerol or DMSO. In certain embodiments, the master cell bank comprises: (a) a CHO cell line comprising a nucleic acid encoding an antibody with (i) a heavy chain amino acid sequence set forth by any one of SEQ ID NOs: 11, 13, 15, 17, or 19; and (ii) a light chain amino acid sequence set forth by any one of SEQ ID NOs: 12, 14, 16, 18, or 20 integrated at a genomic location; and (b) a cryoprotectant. In certain embodiments, the cryoprotectant comprises glycerol or DMSO. In certain embodiments, the master cell bank is contained in a suitable vial or container able to withstand freezing by liquid nitrogen.

Also described herein are methods of producing an antibody described herein. Such methods comprise incubating a cell or cell-line comprising a nucleic acid encoding the antibody in a cell culture medium under conditions sufficient to allow for expression and secretion of the antibody, and further harvesting the antibody from the cell culture medium. The harvesting can further comprise one or more purification steps to remove live cells, cellular debris, non-antibody proteins or polypeptides, undesired salts, buffers, and medium components. In certain embodiments, the additional purification step(s) include centrifugation, ultracentrifugation, protein A, protein G, protein A/G, or protein L purification, and/or ion exchange chromatography.

FLT3 Agonist Antibodies

Described herein are FLT3 agonistic antibodies and antigen binding fragments thereof. These antibodies and antigen binding fragments have the effect of increasing signaling through the FLT3 receptor. In certain embodiments, the antibodies and antigen binding fragments described herein activate STAT5 transcription by at least about 2-fold, 3-fold, 5-fold, or 10-fold compared to an isotype control. In certain embodiments, the antibodies and antigen binding fragments described herein increase the amount of dendritic cells or hematologic dendritic cell precursors by at least about 1.25-fold, 1.5-fold, 2-fold, or 3-fold when cultured with human peripheral blood mononuclear and/or bone marrow cells. Dendritic cells can be identified by the CD11c positive cells, or the combination of CD11c positivity and high levels of MHC class II expression. In certain embodiments, the EC50 of the increases in the amount of dendritic cells or hematologic dendritic cell precursors when contacted with human peripheral blood mononuclear and/or bone marrow derived cells is less than about 200 picomolar (pM), 150 pM, 140 pM, 130 pM, 126 pM, 120 pM, 110 pM, or 100 pM.

In some embodiments, the antibodies described herein bind to FLT3. In some embodiments, the antibodies described herein induce phosphorylation of FLT3 when bound to FLT3. In some embodiments, the antibodies described herein crosslink or dimerizes two FLT3 receptors resulting in phosphorylation and activation of the two FLT3 receptors. In some embodiments, the antibodies described herein induce a cell expressing FLT3 to internalize and degrade said FLT3 when bound to said FLT3.

In a certain aspect, an FLT3 agonistic antibody or antigen binding fragment comprises an immunoglobulin variable region heavy chain and an immunoglobulin variable region light chain comprising the complementarity determining regions of the chimeric NB 1016, the humanized 1063, or a deamidation variant NB112, NB113, NB114, or NB115. In certain embodiments, the FLT3 agonistic antibody comprises an immunoglobulin variable region heavy chain and an immunoglobulin variable region light chain, wherein the immunoglobulin variable region heavy chain comprises: (a) a variable region heavy chain complementarity determining region 1 (VH-CDR1) comprising the amino acid sequence set forth in SEQ ID NO: 1 (GFTFSNY); 2 (NYGMA); or 29 (GFTFSNYGMA); (b) a variable region heavy chain complementarity determining region 2 (VH-CDR2) comprising the amino acid sequence set forth in SEQ ID NO: 3 (HSGGGD) or 4 (SIHSGGGDTYYRDSVKG); and (c) a variable region heavy chain complementarity determining region 3 (VH-CDR3) comprising the amino acid sequence set forth in SEQ ID NO: 5 (GRTPTGYYFDH); and the immunoglobulin variable region light chain comprises: (d) a variable region light chain complementarity determining region 1 (VL-CDR1) comprising the amino acid sequence set forth in SEQ ID NO: 6 (RASEGIINGLA); (e) a variable region light chain complementarity determining region 2 (VL-CDR2) comprising the amino acid sequence set forth in SEQ ID NO: 11 (NANSLHS); and (f) a variable region light chain complementarity determining region 3 (VL-CDR3) comprising the amino acid sequence set forth in any one of SEQ ID NO: 12 (QQYYDYPLT). There is a potential "NG" deamination site in the VL-CDR1 of NB1016 and NB1063. This can lead to heterogeneous product in downstream processing. Therefore, disclosed herein are antibodies that comprise a variant of VL-CDR1 that does not possess an asparagine at position 8 of SEQ ID NO: 6 and still retains FLT3 binding activity. In certain embodiments, the recombinant antibody further comprises a human light chain constant region and a human heavy chain constant region. In certain embodiments, the recombinant antibody is humanized.

The asparagine in the variable region light chain complementarity determining region 1 of the chimeric NB1016 and humanized NB1063 clones is a potential deamidation site. Deamidation can be detrimental to antibodies that are used as therapeutics as deamidation increases antibody heterogeneity and decreases antibody stability. Therefore, contemplated herein are mutants of the NB1016 and NB1063 CDR regions that substitute the asparagine with another amino acid. In certain embodiments, substitution with a different amino acid results in no or only negligible loss of affinity or functional activity as defined by target binding or induction of STAT5 expression compared to NB1016 or NB1063. In certain embodiments, described herein is a recombinant antibody that specifically binds FMS like tyrosine kinase 3 (FLT3) comprising an immunoglobulin variable region heavy chain and an immunoglobulin variable region light chain, wherein the immunoglobulin variable region heavy chain comprises: (a) a variable region heavy chain complementarity determining region 1 (VH-CDR1) comprising the amino acid sequence set forth in SEQ ID NO: 1 (GFTFSNY); 2 (NYGMA) or 29 (GFTFSNYGMA); (b) a variable region heavy chain complementarity determining region 2 (VH-CDR2) comprising the amino acid sequence set forth in SEQ ID NO: 3 (HSGGGD) or 4 (SIHSGGGDTYYRDSVKG); (c) a variable region heavy chain complementarity determining region 3 (VH-CDR3) comprising the amino acid sequence set forth in SEQ ID NO: 5 (GRTPTGYYFDH); and the immunoglobulin variable region light chain comprises: (d) a variable region light chain complementarity determining region 1 (VL-CDR1)

comprising the amino acid sequence set forth as (RASEGIHXGLA); (e) a variable region light chain complementarity determining region 2 (VL-CDR2) comprising the amino acid sequence set forth in SEQ ID NO: 11 (NANSLHS); and (f) a variable region light chain complementarity determining region 3 (VL-CDR3) comprising the amino acid sequence set forth in any one of SEQ ID NO: 12 (QQYYDYPLT). In certain embodiments, the X of RASEGIHXGLA is any amino acid that results in no reduction of target binding or induction of STAT5 expression compared to NB1016 or NB1063. In certain embodiments, the X of RASEGIHXGLA is any amino acid that results in less than about 25%, 20%, 15%, 10%, or 5% reduction of target binding or induction of STAT5 expression compared to NB1016 or NB1063. In certain embodiments, the X of RASEGIHXGLA is an amino acid selected from aspartic acid, serine, threonine, or leucine. In certain embodiments, the VL-CDR1 comprises an amino acid sequence selected from the list consisting of SEQ ID NO: 7 (RASEGIHDGLA), SEQ ID NO: 8 (RASEGIHSGLA), SEQ ID NO: 9 (RASEGIHTGLA), and SEQ ID NO: 10 (RASEGIHLGLA). In certain embodiments, the recombinant antibody further comprises a human light chain constant region and a human heavy chain constant region. In certain embodiments, the recombinant antibody is humanized.

In certain embodiments, the FLT3 agonistic antibody comprises an immunoglobulin variable region heavy chain and an immunoglobulin variable region light chain, wherein the immunoglobulin variable region heavy chain comprises: (a) a variable region heavy chain complementarity determining region 1 (VH-CDR1) comprising the amino acid sequence set forth in SEQ ID NO: 1 (GFTFSNY); 2 (NYGMA) or 29 (GFTFSNYGMA); (b) a variable region heavy chain complementarity determining region 2 (VH-CDR2) comprising the amino acid sequence set forth in SEQ ID NO: 3 (HSGGGD) or 4 (SIHSGGGDTYYRDSVKG); and (c) a variable region heavy chain complementarity determining region 3 (VH-CDR3) comprising the amino acid sequence set forth in SEQ ID NO: 5 (GRTPTGYYFDH); and the immunoglobulin variable region light chain comprises: (d) a variable region light chain complementarity determining region 1 (VL-CDR1) comprising the amino acid sequence set forth in SEQ ID NO: 7 (RASEGIHDGLA); (e) a variable region light chain complementarity determining region 2 (VL-CDR2) comprising the amino acid sequence set forth in SEQ ID NO: 11 (NANSLHS); and (f) a variable region light chain complementarity determining region 3 (VL-CDR3) comprising the amino acid sequence set forth in any one of SEQ ID NO: 12 (QQYYDYPLT). In certain embodiments, the recombinant antibody further comprises a human light chain constant region and a human heavy chain constant region. In certain embodiments, the recombinant antibody is humanized.

In certain embodiments, the FLT3 agonistic antibody comprises an immunoglobulin variable region heavy chain and an immunoglobulin variable region light chain, wherein the immunoglobulin variable region heavy chain comprises: (a) a variable region heavy chain complementarity determining region 1 (VH-CDR1) comprising the amino acid sequence set forth in SEQ ID NO: 1 (GFTFSNY); 2 (NYGMA); or 29 (GFTFSNYGMA); (b) a variable region heavy chain complementarity determining region 2 (VH-CDR2) comprising the amino acid sequence set forth in SEQ ID NO: 3 (HSGGGD) or 4 (SIHSGGGDTYYRDSVKG); and (c) a variable region heavy chain complementarity determining region 3 (VH-CDR3) comprising the amino acid sequence set forth in SEQ ID NO: 5 (GRTPTGYYFDH); and the immunoglobulin variable region light chain comprises: (d) a variable region light chain complementarity determining region 1 (VL-CDR1) comprising the amino acid sequence set forth in SEQ ID NO: 8 (RASEGIHSGLA); (e) a variable region light chain complementarity determining region 2 (VL-CDR2) comprising the amino acid sequence set forth in SEQ ID NO: 11 (NANSLHS); and (f) a variable region light chain complementarity determining region 3 (VL-CDR3) comprising the amino acid sequence set forth in any one of SEQ ID NO: 12 (QQYYDYPLT). In certain embodiments, the recombinant antibody further comprises a human light chain constant region and a human heavy chain constant region. In certain embodiments, the recombinant antibody is humanized.

In certain embodiments, the FLT3 agonistic antibody comprises an immunoglobulin variable region heavy chain and an immunoglobulin variable region light chain, wherein the immunoglobulin variable region heavy chain comprises: (a) a variable region heavy chain complementarity determining region 1 (VH-CDR1) comprising the amino acid sequence set forth in SEQ ID NO: 1 (GFTFSNY); 2 (NYGMA); or 29 (GFTFSNYGMA); (b) a variable region heavy chain complementarity determining region 2 (VH-CDR2) comprising the amino acid sequence set forth in SEQ ID NO: 3 (HSGGGD) or 4 (SIHSGGGDTYYRDSVKG); and (c) a variable region heavy chain complementarity determining region 3 (VH-CDR3) comprising the amino acid sequence set forth in SEQ ID NO: 5 (GRTPTGYYFDH); and the immunoglobulin variable region light chain comprises: (d) a variable region light chain complementarity determining region 1 (VL-CDR1) comprising the amino acid sequence set forth in SEQ ID NO: 9 (RASEGIHTGLA); (e) a variable region light chain complementarity determining region 2 (VL-CDR2) comprising the amino acid sequence set forth in SEQ ID NO: 11 (NANSLHS); and (f) a variable region light chain complementarity determining region 3 (VL-CDR3) comprising the amino acid sequence set forth in any one of SEQ ID NO: 12 (QQYYDYPLT). In certain embodiments, the recombinant antibody further comprises a human light chain constant region and a human heavy chain constant region. In certain embodiments, the recombinant antibody is humanized.

In certain embodiments, the FLT3 agonistic antibody comprises an immunoglobulin variable region heavy chain and an immunoglobulin variable region light chain, wherein the immunoglobulin variable region heavy chain comprises: (a) a variable region heavy chain complementarity determining region 1 (VH-CDR1) comprising the amino acid sequence set forth in SEQ ID NO: 1 (GFTFSNY); 2 (NYGMA); or 29 (GFTFSNYGMA); (b) a variable region heavy chain complementarity determining region 2 (VH-CDR2) comprising the amino acid sequence set forth in SEQ ID NO: 3 (HSGGGD) or 4 (SIHSGGGDTYYRDSVKG); and (c) a variable region heavy chain complementarity determining region 3 (VH-CDR3) comprising the amino acid sequence set forth in SEQ ID NO: 5 (GRTPTGYYFDH); and the immunoglobulin variable region light chain comprises: (d) a variable region light chain complementarity determining region 1 (VL-CDR1) comprising the amino acid sequence set forth in SEQ ID NO: 10 (RASEGIHLGLA); (e) a variable region light chain complementarity determining region 2 (VL-CDR2) comprising the amino acid sequence set forth in SEQ ID NO: 11 (NANSLHS); and (f) a variable region light chain complementarity determining region 3 (VL-CDR3) comprising the amino acid sequence set forth in any one of SEQ ID NO: 12

(QQYYDYPLT). In certain embodiments, the recombinant antibody further comprises a human light chain constant region and a human heavy chain constant region. In certain embodiments, the recombinant antibody is humanized.

Also described herein are immunoglobulin heavy chain variable regions and immunoglobulin light chain variable regions from antibodies with agonist activity for FLT3.

In certain embodiments, described herein, is a recombinant antibody that specifically binds FMS like tyrosine kinase 3 (FLT3) comprising: (a) an immunoglobulin heavy chain variable region (VH) sequence comprising an amino acid sequence at least about 85%, 90%, 95%, 97%, 98%, 99%, or 100% identical to the amino acid sequence set forth in any one of SEQ ID NOs: 15; 17; 19; 21; or 23; and (b) an immunoglobulin light chain variable region (VL) sequence comprising an amino acid sequence at least about 85%, 90%, 95%, 97%, 98%, 99%, or 100% identical to the amino acid sequence set forth in any one of SEQ ID NOs: 16; 18; 20; 22; 24; 25; 26; 27; and 28. In certain embodiments, the recombinant antibody comprises: (a) an immunoglobulin heavy chain variable region (VH) that comprises an amino acid sequence at least about 85%, 90%, 95%, 97%, 98%, 99%, or 100% identical to the amino acid sequence set forth in SEQ ID NO: 15; and (b) an immunoglobulin light chain variable region (VL) that comprises an amino acid sequence at least about 85%, 90%, 95%, 97%, 98%, 99%, or 100% identical to the amino acid sequence set forth in any one of SEQ ID NO: 16. The asparagine in the variable region light chain complementarity determining region 1 of the VL region of any one of SEQ ID NOs: 16; 18; 20; 22; or 24 is a potential deamidation site. Therefore, contemplated herein are mutants of the VL-CDR regions that substitute the asparagine with another amino acid. In certain embodiments, substitution with a different amino acid results in no or only negligible loss of affinity or functional activity as defined by target binding or induction of STAT5 expression compared to NB1016 or NB1063. In certain embodiments, substitution with a different amino acid results in less than about 25%, 20%, 15%, 10%, or 5% reduction of target binding or induction of STAT5 expression compared to NB1016 or NB1063. In certain embodiments, the VL of the described antibody comprises an amino acid sequence at least about 85%, 90%, 95%, 97%, 98%, 99%, or 100% identical to the amino acid sequence set forth in any one of SEQ ID NOs: 25; 26; 27; and 28, while preserving the mutation to reduce deamidation reactions of the VL-CDR1.

In certain embodiments, described herein, is a recombinant antibody that specifically binds FMS like tyrosine kinase 3 (FLT3) comprising: (a) an immunoglobulin heavy chain variable region (VH) sequence comprising an amino acid sequence at least about 85%, 90%, 95%, 97%, 98%, 99%, or 100% identical to the amino acid sequence set forth in SEQ ID NO: 15 and (b) an immunoglobulin light chain variable region (VL) sequence comprising an amino acid sequence at least about 85%, 90%, 95%, 97%, 98%, 99%, or 100% identical to the amino acid sequence set forth in SEQ ID NO: 25, 26, 27 or 28. In certain embodiments, the recombinant antibody comprises: (a) an immunoglobulin heavy chain variable region (VH) sequence that comprises an amino acid sequence at least about 85%, 90%, 95%, 97%, 98%, 99%, or 100% identical to the amino acid sequence set forth in SEQ ID NO: 15 and (b) an immunoglobulin light chain variable region (VL) sequence that comprise an amino acid sequence at least about 85%, 90%, 95%, 97%, 98%, 99%, or 100% identical to the amino acid sequence set forth in SEQ ID NO: 25. In certain embodiments, the recombinant antibody comprises: (a) an immunoglobulin heavy chain variable region (VH) sequence that comprises an amino acid sequence at least about 85%, 90%, 95%, 97%, 98%, 99%, or 100% identical to the amino acid sequence set forth in SEQ ID NO: 15 and (b) an immunoglobulin light chain variable region (VL) sequence that comprise an amino acid sequence at least about 85%, 90%, 95%, 97%, 98%, 99%, or 100% identical to the amino acid sequence set forth in SEQ ID NO: 26. In certain embodiments, the recombinant antibody comprises: (a) an immunoglobulin heavy chain variable region (VH) sequence that comprises an amino acid sequence at least about 85%, 90%, 95%, 97%, 98%, 99%, or 100% identical to the amino acid sequence set forth in SEQ ID NO: 15 and (b) an immunoglobulin light chain variable region (VL) sequence that comprise an amino acid sequence at least about 85%, 90%, 95%, 97%, 98%, 99%, or 100% identical to the amino acid sequence set forth in SEQ ID NO: 27. In certain embodiments, the recombinant antibody comprises: (a) an immunoglobulin heavy chain variable region (VH) sequence that comprises an amino acid sequence at least about 85%, 90%, 95%, 97%, 98%, 99%, or 100% identical to the amino acid sequence set forth in SEQ ID NO: 15 and (b) an immunoglobulin light chain variable region (VL) sequence that comprise an amino acid sequence at least about 85%, 90%, 95%, 97%, 98%, 99%, or 100% identical to the amino acid sequence set forth in SEQ ID NO: 28.

In some embodiments, the FLT3 agonist antibodies herein result in recruitment and/or expansion of dendritic cells or hematologic dendritic cell precursors to the tumor microenvironment when administered to an individual. In some embodiments, the FLT3 agonist antibodies herein recruit and/or expand dendritic cells when administered to an individual. In some embodiments, the FLT3 agonist antibodies herein recruit and/or expand dendritic cells, Dendritic cells can be identified by the positivity for the cell surface marker CD11c. In some embodiments, the FLT3 agonist antibodies herein recruit and/or expand conventional dendritic cells (cDCs) subsets—cDC1 and cDC2 when administered to an individual. In some embodiments, the FLT3 agonist antibodies herein recruit and/or expand plasmacytoid dendritic cells (pDCs) when administered to an individual. In some embodiments, the FLT3 agonist antibodies herein recruit dendritic cells, conventional dendritic cells subsets cDC1, cDC2 plasmacytoid dendritic cells, or any combination thereof, when administered to an individual. cDC1 dendritic cells can be identified by a cell-surface expression pattern comprising Lin$^-$HLA$^-$ DR$^+$CD11c$^+$ BDCA$^-$3$^+$. PDC dendritic cells can be identified by a cell-surface expression pattern comprising Lin$^-$HLA$^-$DR$^+$ CD123$^+$BDCA$^-$2$^+$.

The FLT3 agonist antibodies described herein can further be conjugated to an immunomodulating moiety. The immunomodulating moiety can comprise any moiety capable of expanding and/or activating dendritic cells or hematologic dendritic cell precursors. In certain embodiments, the immunomodulating moiety comprises a STING agonist. Stimulator of interferon genes (STING), also known as transmembrane protein 173 (TMEM173) is a potent activator of immune signaling pathways activating transcription factors such as STAT6 and IRF3 leading to transcription and secretion of type I interferons. In certain embodiments, the STING agonist comprises 2',3'-cGAMP (CAS Number, 1441190-66-4), 4-[(2-Chloro-6-fluorophenyl)methyl]-N-(furan-2-ylmethyl)-3-oxo-1,4-benzothiazine-6-carboxamide, MK-1454, ADU-S100/MIW815, SRCB-0074, SYNB1891, E-7766, or SB11285. STING agonists can be covalently coupled to a recombinant antibody or antigen binding fragment of the current disclosure using suitable techniques known in the art. STING agonists can be covalently coupled to a recombinant antibody or antigen binding fragment of the current disclosure at a suitable drug to antibody ratio of, for example, 1:1, 2:1, 3:1, 4:1, 5:1, 6:1, or 7:1.

Treatment of Cancer

FLT3L has been shown to lead to an increase in the number of dendritic cells in vivo and induce tumor regression and antitumor immune responses in vivo in syngeneic methylcholanthrene (MCA)-induced fibrosarcoma mouse models. (See Lynch, D. H., et al. "Flt3 ligand induces tumor regression and antitumor immune responses in vivo." *Nature Medicine,* 3(6), 625-631. (1997)). However, FLT3L therapy suffers from limited pharmacokinetic availability and complex dosing requirements. Studies show at least 10 daily injections of FLT3L were required for substantial decreases in tumor growth rate and induction of tumor regression, but 14 to 19 days of treatment appeared to be optimal.

Daily FLT3L treatment up to 7 days after tumor challenge has been shown to lead to tumor rejection in MCA-induced fibrosarcoma mouse models. (See Lynch, D. H., et al. 1997).

In certain embodiments, disclosed herein, are antibodies useful for the treatment of a cancer or tumor. Treatment refers to a method that seeks to improve or ameliorate the condition being treated. With respect to cancer, treatment includes, but is not limited to, reduction of tumor volume, reduction in growth of tumor volume, increase in progression-free survival, or overall life expectancy. In certain embodiments, treatment will effect remission of a cancer being treated. In certain embodiments, treatment encompasses use as a prophylactic or maintenance dose intended to prevent reoccurrence or progression of a previously treated cancer or tumor. It is understood by those of skill in the art that not all individuals will respond equally, or at all, to a treatment that is administered, nevertheless these individuals are considered to be treated.

In certain embodiments, the cancer or tumor is a solid cancer or tumor. In certain embodiments, the cancer or tumor is a blood cancer or tumor. In certain embodiments, the cancer or tumor comprises breast, heart, lung, small intestine, colon, spleen, kidney, bladder, head, neck, ovarian, prostate, brain, pancreatic, skin, bone, bone marrow, blood, thymus, uterine, testicular, and liver tumors. In certain embodiments, tumors which can be treated with the antibodies of the invention comprise adenoma, adenocarcinoma, angiosarcoma, astrocytoma, epithelial carcinoma, germinoma, glioblastoma, glioma, hemangioendothelioma, hemangiosarcoma, hematoma, hepatoblastoma, leukemia, lymphoma, medulloblastoma, melanoma, neuroblastoma, osteosarcoma, retinoblastoma, rhabdomyosarcoma, sarcoma and/or teratoma. In certain embodiments, the tumor/cancer is selected from the group of acral lentiginous melanoma, actinic keratosis, adenocarcinoma, adenoid cystic carcinoma, adenomas, adenosarcoma, adenosquamous carcinoma, astrocytic tumors, Bartholin gland carcinoma, basal cell carcinoma, bronchial gland carcinoma, capillary carcinoid, carcinoma, carcinosarcoma, cholangiocarcinoma, chondrosarcoma, cystadenoma, endodermal sinus tumor, endometrial hyperplasia, endometrial stromal sarcoma, endometrioid adenocarcinoma, ependymal sarcoma, Swing's sarcoma, focal nodular hyperplasia, gastronoma, germ line tumors, glioblastoma, glucagonoma, hemangioblastoma, hemangioendothelioma, hemangioma, hepatic adenoma, hepatic adenomatosis, hepatocellular carcinoma, insulinite, intraepithelial neoplasia, intraepithelial squamous cell neoplasia, invasive squamous cell carcinoma, large cell carcinoma, liposarcoma, lung carcinoma, lymphoblastic leukemia, lymphocytic leukemia, leiomyosarcoma, melanoma, malignant melanoma, malignant mesothelial tumor, nerve sheath tumor, medulloblastoma, medulloepithelioma, mesothelioma, mucoepidermoid carcinoma, myeloid leukemia, neuroblastoma, neuroepithelial adenocarcinoma, nodular melanoma, osteosarcoma, ovarian carcinoma, papillary serous adenocarcinoma, pituitary tumors, plasmacytoma, pseudosarcoma, prostate carcinoma, pulmonary blastoma, renal cell carcinoma, retinoblastoma, rhabdomyosarcoma, sarcoma, serous carcinoma, squamous cell carcinoma, small cell carcinoma, soft tissue carcinoma, somatostatin secreting tumor, squamous carcinoma, squamous cell carcinoma, undifferentiated carcinoma, uveal melanoma, verrucous carcinoma, vagina/vulva carcinoma, VIPpoma, and Wilm's tumor. In certain embodiments, the tumor/cancer to be treated with one or more antibodies of the invention comprise brain cancer, head and neck cancer, colorectal carcinoma, acute myeloid leukemia, pre-B-cell acute lymphoblastic leukemia, bladder cancer, astrocytoma, preferably grade II, III or IV astrocytoma, glioblastoma, glioblastoma multiforme, small cell cancer, and non-small cell cancer, preferably non-small cell lung cancer, lung adenocarcinoma, metastatic melanoma, androgen-independent metastatic prostate cancer, androgen-dependent metastatic prostate cancer, prostate adenocarcinoma, and breast cancer, preferably breast ductal cancer, and/or breast carcinoma. In certain embodiments, the cancer treated with the antibodies of this disclosure comprises glioblastoma. In certain embodiments, the cancer treated with one or more antibodies of this disclosure comprises pancreatic cancer. In certain embodiments, the cancer treated with one or more antibodies of this disclosure comprises ovarian cancer. In certain embodiments, the cancer treated with one or more antibodies of this disclosure comprises lung cancer. In certain embodiments, the cancer treated with one or more antibodies of this disclosure comprises prostate cancer. In certain embodiments, the cancer treated with one or more antibodies of this disclosure comprises colon cancer. In certain embodiments, the cancer treated comprises glioblastoma, pancreatic cancer, ovarian cancer, colon cancer, prostate cancer, or lung cancer. In a certain embodiment, the cancer is refractory to other treatment. In a certain embodiment, the cancer treated is relapsed. In a certain embodiment, the cancer is a relapsed/refractory glioblastoma, pancreatic cancer, ovarian cancer, colon cancer, prostate cancer, or lung cancer.

Therapeutic Methods

In certain embodiments, the antibodies described herein can be administered to a subject in need thereof by any route suitable for the administration of antibody-containing pharmaceutical compositions, such as, for example, subcutaneous, intraperitoneal, intravenous, intramuscular, intratumoral, or intracerebral, etc. In certain embodiments, the antibodies are administered intravenously. In certain embodiments, the antibodies are administered on a suitable dosage schedule, for example, weekly, twice weekly, monthly, twice monthly, once every two weeks, once every three weeks, or once a month etc. In certain embodiments, the antibodies are administered once every three weeks. The antibodies can be administered in any therapeutically effective amount. In certain embodiments, the therapeutically acceptable amount is between about 0.1 mg/kg and about 50 mg/kg. In certain embodiments, the therapeutically acceptable amount is between about 1 mg/kg and about 40 mg/kg. In certain embodiments, the therapeutically acceptable amount is between about 5 mg/kg and about 30 mg/kg.

The FLT3 agonistic antibodies described herein possess more favorable PK/PD characteristics than the soluble ligand allowing for a dosing schedule that does not require daily administration. In some embodiments, the dosing interval between doses to an individual with the antibodies described herein can be about 2 days to about 14 days. In some embodiments, the dosing interval between doses to an individual with the antibodies described herein can be about 2 days to about 3 days, about 2 days to about 4 days, about 2 days to about 5 days, about 2 days to about 6 days, about 2 days to about 7 days, about 2 days to about 8 days, about 2 days to about 9 days, about 2 days to about 10 days, about 2 days to about 11 days, about 2 days to about 12 days, about 2 days to about 14 days, about 3 days to about 4 days, about 3 days to about 5 days, about 3 days to about 6 days, about 3 days to about 7 days, about 3 days to about 8 days, about 3 days to about 9 days, about 3 days to about 10 days, about 3 days to about 11 days, about 3 days to about 12 days, about 3 days to about 14 days, about 4 days to about 5 days, about 4 days to about 6 days, about 4 days to about 7 days, about 4 days to about 8 days, about 4 days to about 9 days, about 4 days to about 10 days, about 4 days to about 11 days, about 4 days to about 12 days, about 4 days to about 14 days, about 5 days to about 6 days, about 5 days to about 7 days, about 5 days to about 8 days, about 5 days to about 9 days, about 5 days to about 10 days, about 5 days to about 11 days, about 5 days to about 12 days, about 5 days to about 14 days, about 6 days to about 7 days, about 6 days to about 8 days, about 6 days to about 9 days, about 6 days to about 10 days, about 6 days to about 11 days, about 6 days to about 12 days, about 6 days to about 14 days, about 7 days to about 8 days, about 7 days to about 9 days, about 7 days to about 10 days, about 7 days to about 11 days, about 7 days to about 12 days, about 7 days to about 14 days, about 8 days to about 9 days, about 8 days to about 10 days, about 8 days to about 11 days, about 8 days to about 12 days, about 8 days to about 14 days, about 9 days to about 10 days, about 9 days to about 11 days, about 9 days to about 12 days, about 9 days to about 14 days, about 10 days to about 11 days, about 10 days to about 12 days, about 10 days to about 14 days, about 11 days to about 12 days, about 11 days to about 14 days, or about 12 days to about 14 days. In some embodiments, the dosing interval between doses to an individual with the antibodies described herein can be about 2 days, about 3 days, about 4 days, about 5 days, about 6 days, about 7 days, about 8 days, about 9 days, about 10 days, about 11 days, about 12 days, or about 14 days. In some embodiments, the dosing interval between doses to individual with the antibodies described herein can be at least about 2 days, about 3 days, about 4 days, about 5 days, about 6 days, about 7 days, about 8 days, about 9 days, about 10 days, about 11 days, or about 12 days. In some embodiments, the dosing interval between doses to an individual with the antibodies described herein can be at most about 3 days, about 4 days, about 5 days, about 6 days, about 7 days, about 8 days, about 9 days, about 10 days, about 11 days, about 12 days, or about 14 days. In some embodiments, the dosing interval between doses to an individual with the antibodies described herein can be about 1 week to about 5 weeks. In some embodiments, the dosing interval between doses to an individual with the antibodies described herein can be about 1 week to about 2 weeks, about 1 week to about 3 weeks, about 1 week to about 4 weeks, about 1 week to about 5 weeks, about 2 weeks to about 3 weeks, about 2 weeks to about 4 weeks, about 2 weeks to about 5 weeks, about 3 weeks to about 4 weeks, about 3 weeks to about 5 weeks, or about 4 weeks to about 5 weeks. In some embodiments, the dosing interval between doses to an individual with the antibodies described herein can be about 1 week, about 2 weeks, about 3 weeks, about 4 weeks, or about 5 weeks. In some embodiments, the doses to interval between dosing an individual with the antibodies described herein can be at least about 1 week, about 2 weeks, about 3 weeks, or about 4 weeks. In some embodiments, the dosing interval between doses to an individual with the antibodies described herein can be at most about 2 weeks, about 3 weeks, about 4 weeks, or about 5 weeks.

In some embodiments, the antibodies described herein can be administered to an individual at risk for developing cancer, or an individual who has previously been successfully treated for cancer including a cancer that has been treated to clinical remission or one that has minimal residual disease.

Pharmaceutically Acceptable Excipients, Carriers, and Diluents

In certain embodiments, the agonist FLT3 antibodies of the current disclosure are included in a pharmaceutical composition comprising one or more pharmaceutically acceptable excipients, carriers, or diluents. In certain embodiments, the antibodies of the current disclosure are administered suspended in a sterile solution. In certain embodiments, the solution comprises about 0.9% NaCl or about 5% dextrose, glucose, or sucrose. In certain embodiments, the solution further comprises one or more of: buffers, for example, acetate, citrate, histidine, succinate, phosphate, bicarbonate and hydroxymethylaminomethane (Tris); surfactants, for example, polysorbate 80 (Tween 80), polysorbate 20 (Tween 20), and poloxamer 188; polyol/disaccharide/polysaccharides, for example, glucose, dextrose, mannose, mannitol, sorbitol, sucrose, trehalose, and dextran 40; amino acids, for example, glycine or arginine; antioxidants, for example, ascorbic acid, methionine; or chelating agents, for example, EDTA or EGTA. In certain embodiments, the antibodies of the current disclosure are shipped/stored lyophilized and reconstituted before administration. In certain embodiments, lyophilized antibody formulations comprise a bulking agent such as, mannitol, sorbitol, sucrose, trehalose, and dextran 40. The lyophilized formulation can be contained in a vial comprised of glass. The antibodies when formulated, whether reconstituted or not, can be buffered at a certain pH, generally less than 7.0. In certain embodiments, the pH can be between 4.5 and 6.5, 4.5 and 6.0, 4.5 and 5.5, 4.5 and 5.0, or 5.0 and 6.0.

Also described herein are kits comprising one or more of the antibodies described herein in a suitable container and one or more additional components selected from: instructions for use; a diluent, an excipient, a carrier, and a device for administration.

In certain embodiments, described herein is a method of preparing a cancer treatment comprising admixing one or more pharmaceutically acceptable excipients, carriers, or diluents and an antibody of the current disclosure. In certain embodiments, described herein is a method of preparing a cancer treatment for storage or shipping comprising lyophilizing one or more antibodies of the current disclosure.

EXAMPLES

The following illustrative examples are representative of embodiments of compositions and methods described herein and are not meant to be limiting in any way.

Example 1—Generation and Screening of an FLT3 Agonistic Antibody

In order to generate antibodies for characterization, rat immunizations were performed. To maximize repertoire diversity, multiple antigens and strains of rats were selected for immunization. Therefore, both Wistar and Sprague Dawley rats were immunized with either recombinant FLT3 protein (ECD), DNA encoding full length FLT3 or DNA encoding full length FLT3 with amino acid insertions in the intracellular domain that result in its intrinsic dimerization. Rats that had positive titers were selected for harvest and hybridoma fusions. Panels of hybridoma supernatants were screened for binding to FLT3, and select clones were carried forward directly into primary functional screening in a STAT5-luciferase reporter-based assay.

Stably expressing human FLT3-STAT5-Luciferase cells were seeded at 40,000 cells/well in a 96-well clear bottom black polystyrene microplate in DMEM supplemented with 10% FBS. The next day, cells were serum-starved for 24 hours in DMEM supplemented with 0.1% FBS. Cells were then treated with either FLT3L or antibodies for 18 hours at 37° C., and ONE-Glo Luciferase reagent was used to quantify the luciferase signal. From the single dose screen, shown in FIG. 1, three clones were identified with the highest activity relative to the FLT3L, one of which is 6B2 (FIG. 1, asterisk). These clones were carried forward for additional screening. Due to poor expression and insufficient quantities for downstream screening, the V regions of 6B2 were sequenced and generated as a rat/human chimeric molecule (6B2-chim). These three clones were subsequently carried forward into full dose response curves in the same STAT5-Luc assay to determine relative potencies. From this screen, clone 6B2 was highlighted as having superior activity as shown in FIG.

Example 2—Generation of Chimeric 6B2 Antibody NB1016 and its Humanized Variants

The heavy and light chains of clone 6B2 were further grafted onto a human IgG4PAA and human kappa light chain backbone to generate a second chimeric molecule NB1016. The 'PAA' is an abbreviation used to denote (i) the S228P mutation, which stabilizes the hinge region to prevent Fab arm exchange (See Silva et al. "The S228P mutation prevents in vivo and in vitro IgG4 Fab-arm exchange as demonstrated using a combination of novel quantitative immunoassays and physiological matrix preparation" *J Biol Chem.* 290(9):5462-9 (2015)) and (ii) the F234A/L235A mutations, which leads to diminished binding to FcγR and C1q and effectively abolishes ADCC and CDC functions (See Glaesner et al. "Engineering and characterization of the long-acting glucagon-like peptide-1 analogue LY2189265, an Fc fusion protein" Diabetes Metab Res Rev; 26: 287-296 (2010)). Humanized NB1016 variants were also generated by CDR grafting, the rat mAb 6B2 V regions were blasted against the IMGT database and the closest related VH and VL germline framework regions were selected as templates for CDR grafting. CDRs were identified based on the KABAT numbering scheme. In total, 5×VH and 5×VL humanized V regions were created, generating 25 humanized variants for screening based on each combination of humanized VH and VL. The 25 humanized variants were screened in a single low dose STAT5-Luc assay along with NB1016 to determine relative activities as shown in Table 1.

TABLE 1

Single dose STAT5-Luc assay measuring activities of humanized variants relative to NB1016 (chimeric). All antibodies were tested at [1 nM]. Variants marked in bold and italics were selected for further screening.

| AML5 at [1 nM] | Humanized VL1 (SEQ ID NO: 16) | Humanized VL2 (SEQ ID NO: 18) | Humanized VL3 (SEQ ID NO: 20) | Humanized VL4 (SEQ ID NO: 22) | Humanized VL5 (SEQ ID NO: 24) |
| --- | --- | --- | --- | --- | --- |
| Humanized VH1 (SEQ ID NO: 15) | *117%* | 72% | *94%* | 91% | *99%* |
| Humanized VH2 (SEQ ID NO: 17) | *103%* | 73% | *94%* | 77% | *91%* |
| Humanized VH3 (SEQ ID NO: 19) | *115%* | 81% | *136%* | n.d. | *120%* |
| Humanized VH4 (SEQ ID NO: 21) | *125%* | 90% | *110%* | *110%* | *107%* |
| Humanized VH5 (SEQ ID NO: 23) | 83% | 53% | 31% | 77% | 75% | n.d., assay not performed

From the screen in Table 1, 12 humanized variants were selected to test in a dose response in a secondary functional screen examining AML5 cell proliferation. AML5 cells were cultured in alpha-MEM with 20% FBS and 200 ng/mL FLT3L for at least 1 week before experiments were run. The day before the assay was initiated, cells were serum-starved overnight using alpha-MEM supplemented with 0.1% FBS without FLT3L. Antibodies or FLT3L was then added, and plates were incubated for 72 hours at 37° C., and proliferation was assessed using CellTiter-Glo reagent (Promega). Table 2 shows the 12 variants were all highly potent, showing comparable activity to each other as well as to the chimeric molecule NB1016. Therefore NB1063, which represents humanized VH1 x humanized VL1 (SEQ ID NOs: 11 and 12), was chosen for further analysis based on choice of framework usage and preliminary analytical characterization (SEC/HIC; data not shown).

TABLE 2

EC50s (nM) of humanized variants in an AML5 proliferation assay. The EC50 for NB1016 in this assay was 0.104 nM.

| AML5 EC50 (nM) | Humanized VL1 (SEQ ID NO: 16) | Humanized VL2 (SEQ ID NO: 18) | Humanized VL3 (SEQ ID NO: 20) | Humanized VL4 (SEQ ID NO: 22) | Humanized VL5 (SEQ ID NO: 24) |
| --- | --- | --- | --- | --- | --- |
| Humanized VH1 (SEQ ID NO: 15) | *0.106* | n.d. | 0.105 | n.d. | 0.097 |
| Humanized VH2 (SEQ ID NO: 17) | 0.080 | n.d. | 0.091 | n.d. | n.d. |
| Humanized VH3 (SEQ ID NO: 19) | 0.076 | n.d. | 0.051 | n.d. | 0.070 |
| Humanized VH4 (SEQ ID NO: 21) | 0.082 | n.d. | 0.091 | 0.095 | 0.098 |
| Humanized VH5 (SEQ ID NO: 23) | n.d. | n.d. | n.d. | n.d. | n.d. |

Example 3-6B2 Agonism Requires Receptor Dimerization and is FcR Independent

Figure 3:
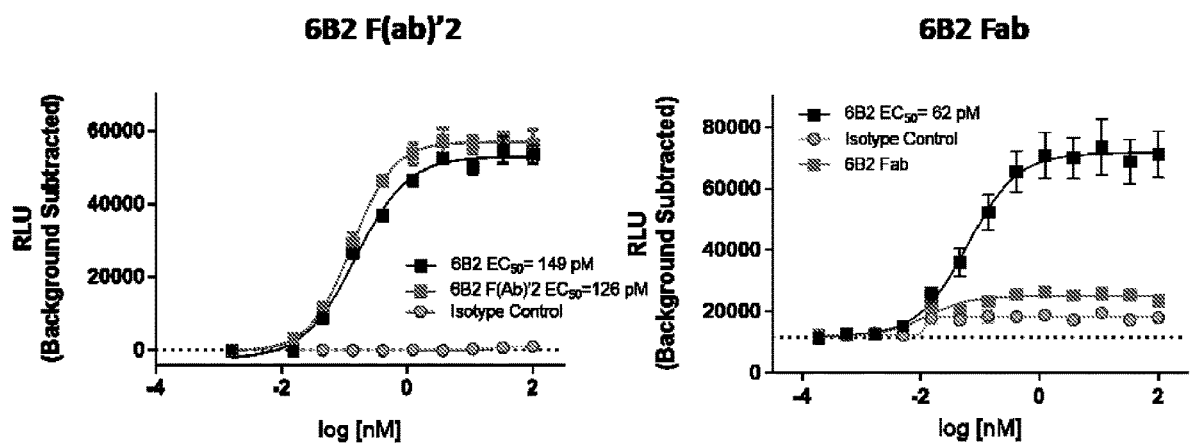
FIG. 3 shows the difference in activity between the bivalent F(ab)'2 (left) and the monovalent Fab (right) for the top clone (6B2) highlighted in FIG. 1 in an AML5 proliferation assay.

In order to understand the mechanism by which the top clone 6B2 agonizes FLT3, a monovalent 6B2 Fab and bivalent 6B2 F(ab)'2 were generated and the antibodies' respective functional activity was measured in a cell proliferation assay using OCI-AML5 cells, known to express Fcγ receptors, and conditioned to be FLT3L dependent. OCI-AML5 cells were conditioned in αMEM+20% heat-inactivated FBS, and 200 ng/mL recombinant FLT3L for 2 weeks, prior to being serum-starved in αMEM+0.1% heat-inactivated FBS (no FLT3L) for 24 hours. Cells were then treated with 6B2, 6B2 Fab, 6B2 F(Ab)'2 or isotype control for 3 days at 37° C., and CellTiter-Glo (Promega) was used to measure cell viability. As shown in FIG. 3 (left), the bivalent 6B2 F(ab)'$_2$ retained agonistic function equivalent to 6B2, indicating that FLT3 agonism is independent of FcR engagement. However, the monovalent 6B2 Fab did not show functional activity in this assay (FIG. 3 right), indicating that FLT3 agonism requires dimerization of FLT3.

Example 4—Liability Identification and NB1063 Variant Generation

The CDR1 of the light chain of NB1063 contained an 'NG' amino acid motif. This motif represents a site for deamidation, which can contribute to drug product heterogeneity in downstream manufacturing. Therefore, a series of light chain variants were generated to remove this liability and identify variants with comparable activity to NB1063. In total, 4 variants were generated (N31D, N31S, N31T, and N31L) and tested in parallel to NB1063 in an AML5 proliferation assay in a dose response, with results shown in Table 3. From this screen, NB11113 was identified as the lead humanized light chain variant (N31S) with deamidation site removed for final testing in a human primary cell-based assay.

TABLE 3

EC50s (nM) for NB1063 and its CDRL1 variants with deamidation site removed in an AML5 proliferation assay

| EC50 (nM) | NB1063 SEQ ID NO: 16 | NB1112 SEQ ID NO: 25 (N31D) | NB1113 SEQ ID NO: 26 (N31S) | NB1114 SEQ ID NO: 27 (N31T) | NB1115 SEQ ID NO: 28 (N31L) |
|---|---|---|---|---|---|
| AML5 Assay | 0.118 | 0.270 | *0.126* | 0.201 | 0.135 |

Example 5—Binding and Functional Activity of NB1113 Against Human and Cynomolgus FLT3

Figure 4:
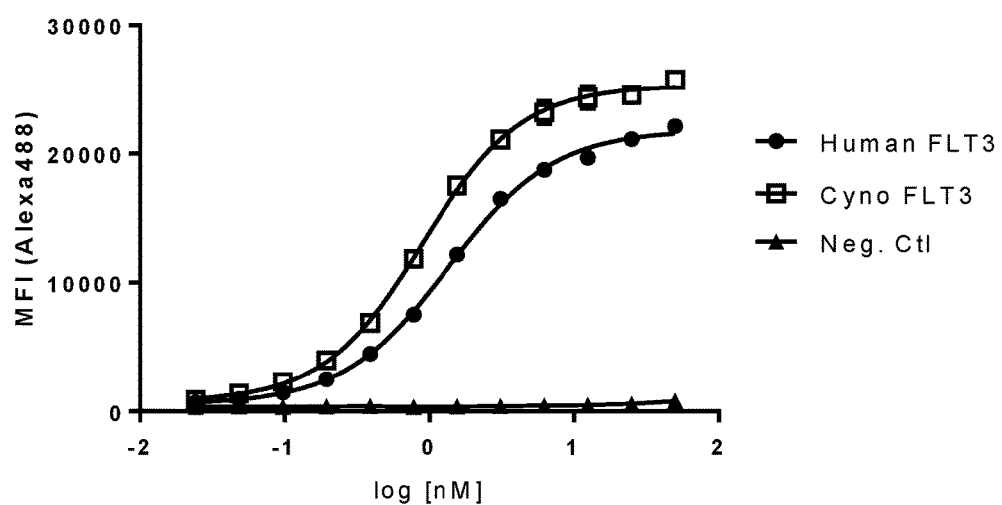
FIG. 4 shows dose response binding curves for NB1113 against HEK 293T cells expressing human or cynomolgus FLT3.

Since NB1113 binds to human FLT3, but not mouse FLT3, the binding and functional activity of NB1113 was evaluated in both human and cynomolgus (cyno) FLT3-expressing systems. Stably expressing human and cyno FLT3-STAT5-Luciferase cells were used for both binding and functional assays. The binding of NB1113 to human or cyno FLT3 was assessed by flow cytometry using different concentrations of NB1113 in PBS+2% FBS, followed by detection using AF488 anti-human IgG (H+L) secondary antibody. As shown in FIG. 4, NB1113 binds similarly to both human and cyno FLT3, with an EC50 of 1.36 nM (human) and 0.90 nM (cyno). These results demonstrated NB1113's cross-reactivity to human and monkey FLT3 while also demonstrating NB1113's potency.

Figure 5:
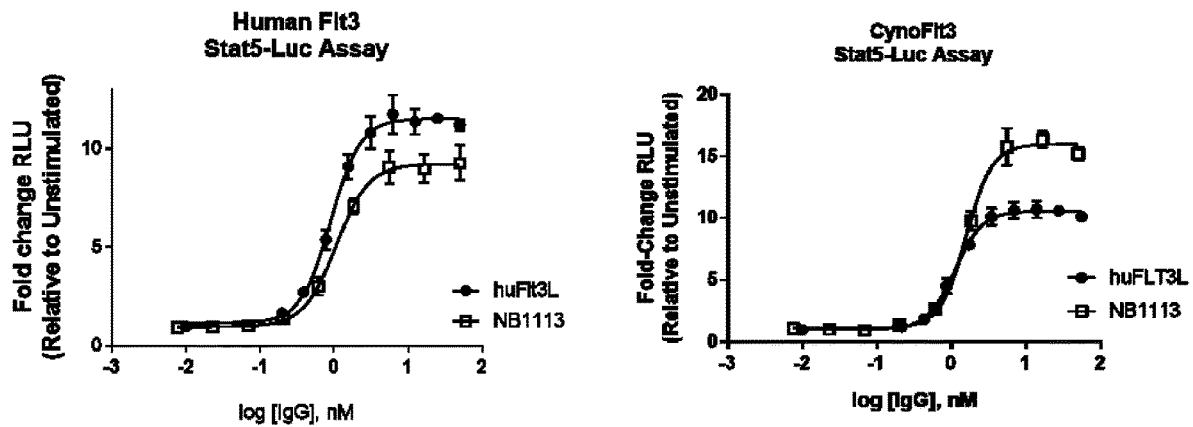
FIG. 5 shows dose response curves for NB1113 in human (left) and cynomolgus (right) FLT3-STAT5-Luc reporter assays.

To assess NB1113 functional activity, human and cyno FLT3-STAT5-Luciferase cells were seeded at 40,000 cells/well in a 96-well clear bottom black polystyrene microplate in DMEM supplemented with 10% FBS. The next day, cells were serum-starved for 24 hours in DMEM supplemented with 0.1% FBS. Cells were then treated with NB1113 for 18 hours at 37° C., and ONE-Glo Luciferase reagent (Promega) was used to quantify the luciferase signal. As shown in FIG. 5, NB1113 shows similar activity in both human and cyno FLT3-STAT5-Luciferase assays, with an EC50 of 1.1 nM (human) and 1.6 nM (cyno).

Example 6—Dendritic Cell (DC) Expansion Assay

Figure 6:
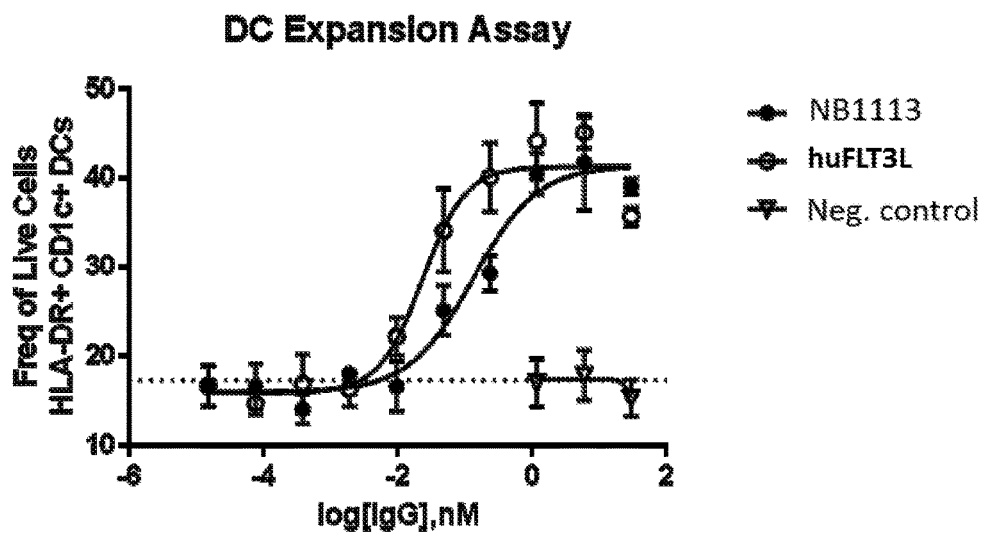
FIG. 6 shows frequency of HLA-DR+CD1c+ cells expanded in vitro from primary human bone marrow after 12 days of treatment with FLT3L, NB1113 or negative control. EC50s for FLT3L and NB1113 are 0.023 nM and 0.113 nM, respectively.

Since FLT3 agonism results in dendritic cell expansion NB1113 was tested in a relevant physiological model. Human bone marrow was obtained from commercial sources and depleted of red blood cells by suspension in ACK lysis buffer. The resultant RBC-lysed bone marrow cells were resuspended in RPMI 1640 media with 10% FBS, 200 nM L-Glutamine, and 50 uM β-mercaptoethanol and seeded in 96-well culture plates at $1.5 \times 10^5$ cells per well. Cultures were incubated in the presence of FLT3L or NB1113 in a dose response for twelve days. At the end of this period, cells were analyzed for dendritic cell proliferation by flow cytometry using standard flow cytometry staining protocols and antibodies to CD1c and HLA-DR+, as well as a live-dead stain. As shown in FIG. 6, NB1113 shows potent expansion of dendritic cells comparable to that of the FLT3L.

Figure 7:
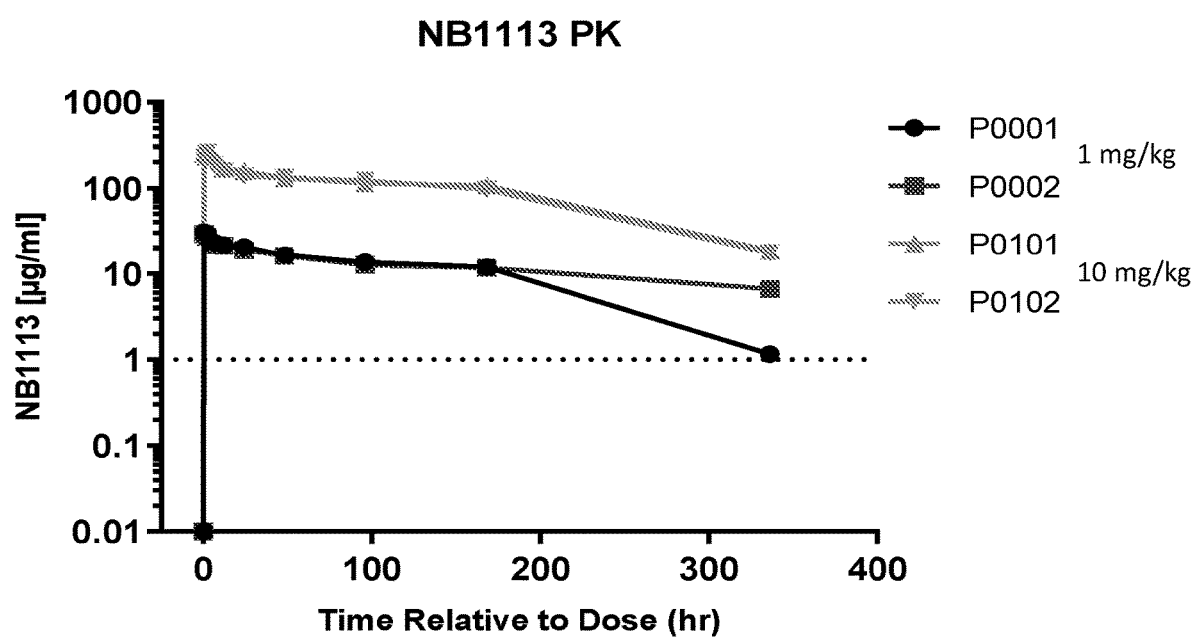
FIG. 7 shows the pharmacokinetic (PK) analysis of NB1113 in individual female cynomolgus monkey serum after a single intravenous dose injection.

Example 7—Pharmacokinetic Analysis of NB1113 and DC Expansion in Cynomolgus Monkeys NB1113 binds to cynomolgus FLT3, therefore the pharmacokinetics and ability of NB1113 to expand DC's in vivo was evaluated in female cynomolgus monkeys. Female cynomolgus monkeys (*Macaca fascicularis*) of Asian origin were assigned to two groups and received either 1 mg/kg or 10 mg/kg of NB1113, respectively. Animals received a single dose on day 1 of the dosing phase via intravenous bolus injection via a saphenous vein at a volume of 5 mL/kg. The vehicle/diluent was phosphate-buffered saline (PBS), pH 7.4 (1×). Assessment of toxicity was based on mortality, clinical observations, body weights, qualitative food consumption, and clinical pathology. A single intravenous administration of 1 or 10 mg/kg NB1113 to cynomolgus monkeys was well tolerated, with no NB1113-related clinical observations. Blood samples for pharmacokinetic evaluation were collected via the femoral vein on day 1 pre-dose and approximately 0.25, 2, 6, 12, 24, 48, 96, 168, 336, 504, and 672 hours post-dose. Blood was collected into serum separator tubes (without anticoagulant), allowed to clot at room temperature, centrifuged within 1 hour of collection and stored at −60 to −80° C., until analyzed. LC-MS/MS analysis was used to determine the concentrations of NB1113 in monkey serum samples using liquid chromatography with tandem mass spectrometric (LC-MS/MS) methods. Exposure, as assessed by NB1113 mean back-extrapolated concentration at time 0 (Co), maximum observed concentration ($C_{max}$), and area under the concentration-time curve from 0 to 672 hours post-dose ($AUC_{0-672}$) values, increased with the increase in dose level from 1 to 10 mg/kg (FIG. 7). The increases in mean $C_{max}$ and $AUC_{0-672}$ values were roughly dose-proportional. The dose level of 10 mg/kg NB1113 corresponded to day 1 mean serum $C_{max}$ and $AUC_{0-672}$ values of 257 pg/mL and 33,300 h·µg/mL, respectively.

Blood samples for immunophenotyping were collected via the femoral vein twice during the pre-dose phase and on days 5, 8, 15, 22, and 28 of the dosing phase. Blood was collected using the anticoagulant potassium EDTA and immediately analyzed using flow cytometry. (See Table 4)

Figure 8:
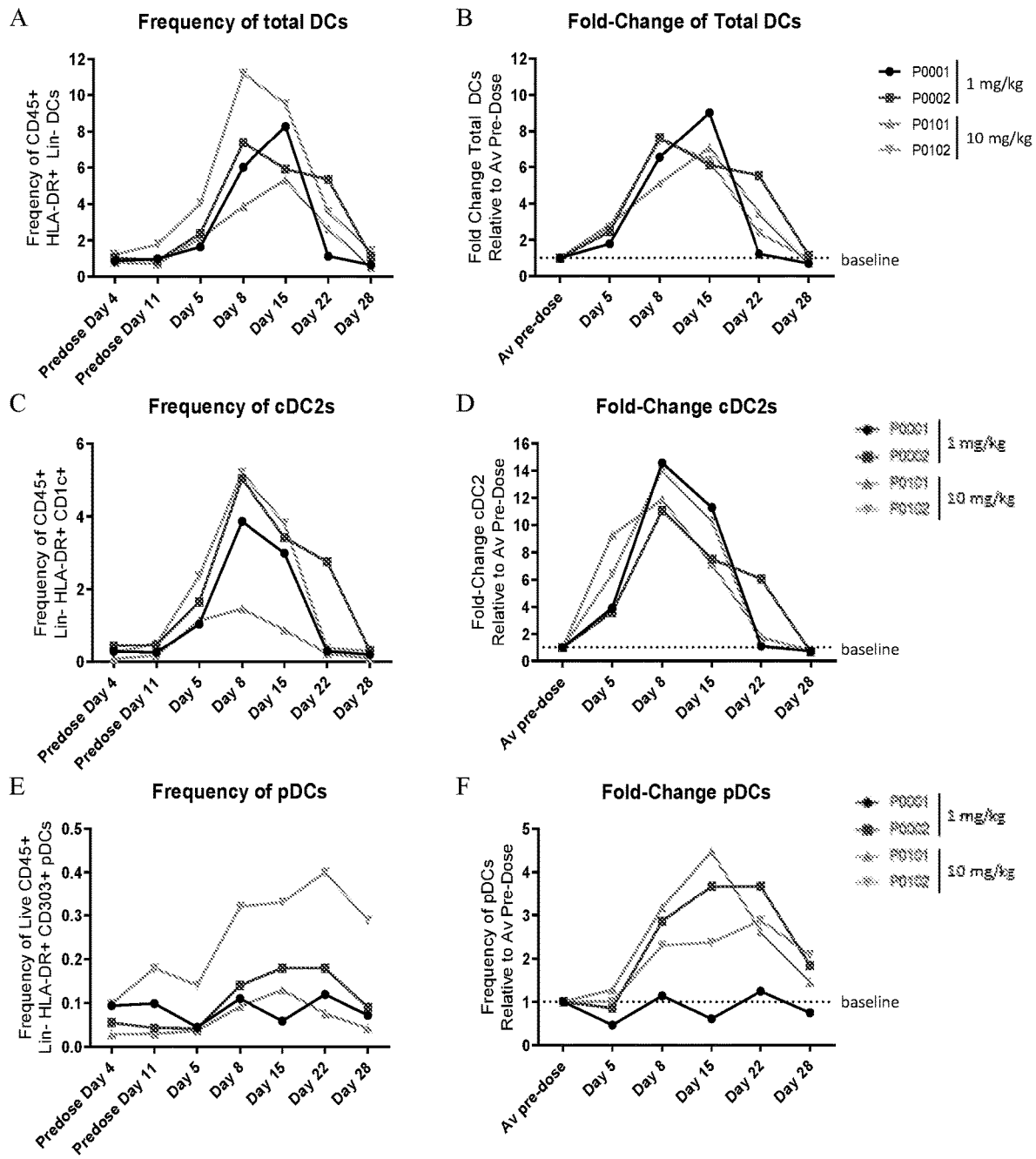
FIG. 8 shows the changes in the total dendritic cell (DCs), classical DC2 (cDC2) and plasmocytic DC (pDC) populations in individual female monkeys after single dose injection of NB1113.

Administration of 1 or 10 mg/kg NB1113 led to an increase in total DCs (defined as Lin$^-$CD16$^-$HLA$^-$DR$^+$ cells), cDC2 (defined as Lin$^-$CD16$^-$HLA$^-$DR$^+$BDCA-1$^+$), and pDC populations (defined as Lin$^-$CD16$^-$HLA$^-$DR$^+$CD123$^+$/bright BDCA$^-$2$^+$) between day 5 and day 22 of the dosing phase (FIG. 8). The results demonstrate that a single IV dose of NB1113 can effectively expand DCs in vivo.

Figure 9:
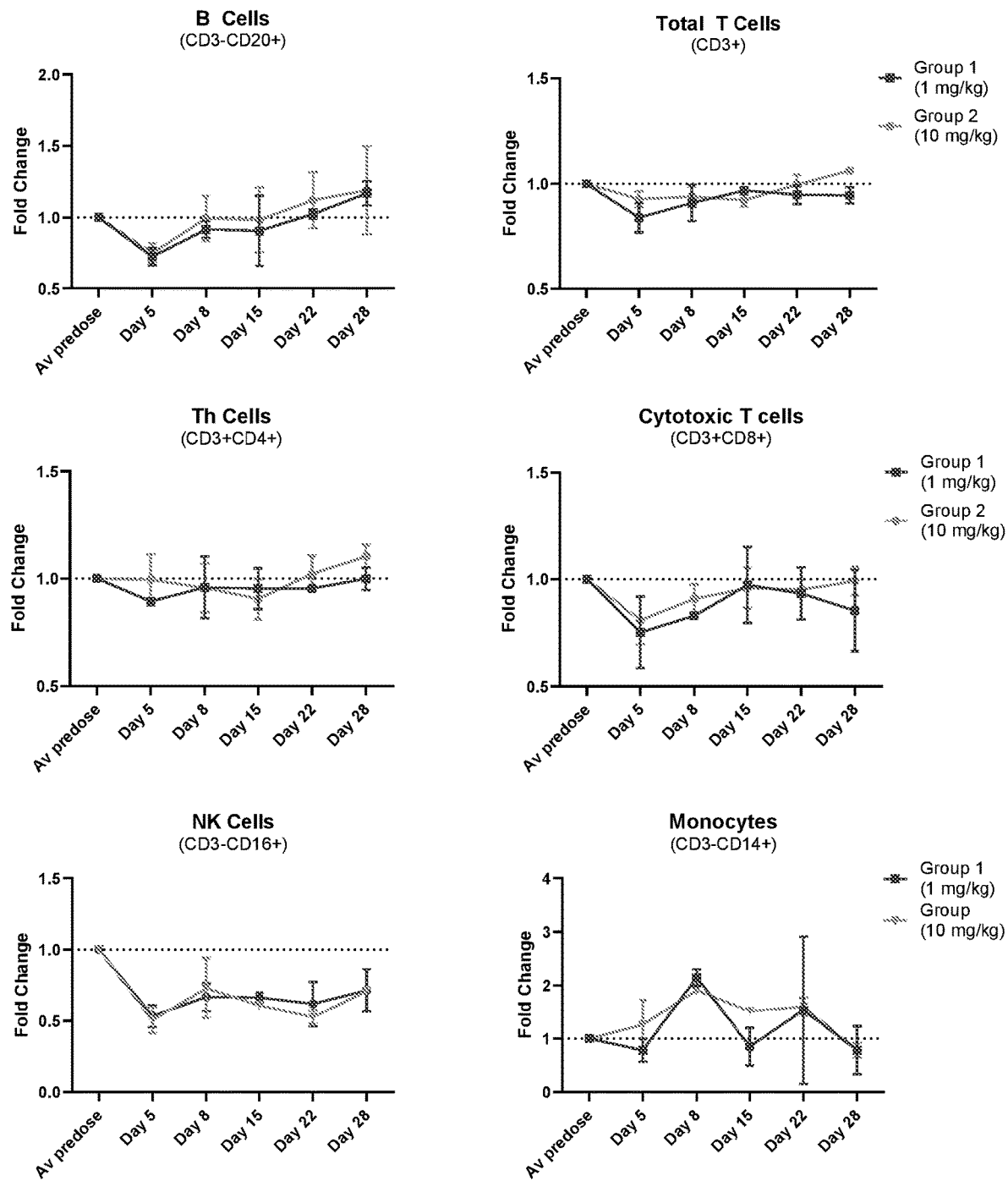
FIG. 9 shows that no significant changes in B and T cell frequency were observed after a single dose of NB1113.

Minor changes were observed in the total T cell (CD3+), helper T cells (Th: CD3+CD4+CD8−), cytotoxic T cells (CD3+CD4−CD8+), and B cells (CD3−CD20+) population were small in magnitude and within the normal range of biological variability noted in this species (FIG. 9). NK cells slightly decreased in response to NB1113 treatment, with levels staying lower than predose values throughout the analysis phase. The small changes observed in the monocyte population were variable between animals and dose groups (FIG. 9).

Figure 10:
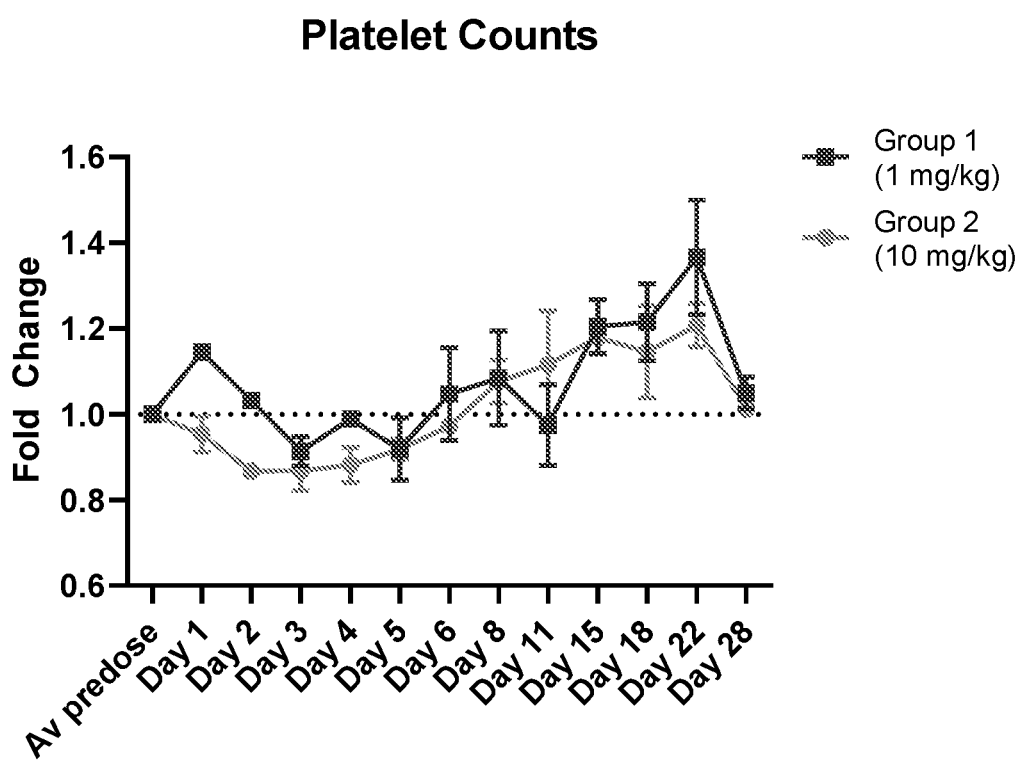
FIG. 10 shows that modest changes in platelet counts were observed after a single dose of NB1113.

To test the effect of NB1113 treatment on platelet numbers, samples for hematological analysis were collected on Days 1, 3, 4, 5, 6, 11, and 18 of the dosing phase. Blood samples were collected from fasted animals via a femoral or cephalic vein. Compared to predose phase values, platelet counts were generally decreased (−1.1 to −17.8%) from days 2 to 6 and increased (+1.1 to +42.8%) from days 8 to 22 before they returned to baseline values by day 28 (FIG. 10). The decreased platelet counts were assumed to be NB1113 related given similar findings in monkeys treated with FLT3 receptor ligand (Reeves et al. "Systemic dendritic cell mobilization associated with administration of FLT3 ligand to SIV- and SHIV-infected macaques." *AIDS Res Hum Retroviruses*. December; 25(12): 1313-28. (2009)).

TABLE 4

| Cell Type | Phenotype |
|---|---|
| Dendritic Cells | Lin−CD16− HLA−DR+ |
| Conventional Dendritic Cells 2 | Lin−CD16−HLA−DR+BDCA-1+ |
| Plasmacytoid Dendritic Cells | Lin−CD16−HLA−DR+CD123+/bright BDCA-2+ |
| Total T Cells | CD3+ |
| Helper T Cells | CD3+ CD4+ CD8− |
| Cytotoxic T Cells | CD3+ CD4− CD8+ |
| B Cells | CD3− CD20+ |
| Natural Killer (NK) Cells | CD3− CD16+ |
| Monocytes | CD3−CD14+ |

Note
The full phenotype represented by Lin− was represented by CD3−CD8−CD14−CD20.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

| | Sequence listings provided herin | |
|---|---|---|
| SEQ ID NO: | Sequence | Origin |
| 1 | GFTFSNY | |
| 2 | NYGMA | |
| 3 | HSGGGD | |
| 4 | SIHSGGGDTYYRDSVKG | |
| 5 | GRTPTGYYFDH | |
| 6 | RASEGIHNGLA | |
| 7 | RASEGIHDGLA | |
| 8 | RASEGIHSGLA | |
| 9 | RASEGIHTGLA | |
| 10 | RASEGIHLGLA | |
| 11 | NANSLHS | |
| 12 | QQYYDYPLT | |
| 13 | EVQLVESGGDLVQPGGSLKLSCAPSGFTFSNYGMAWIRQAPTMGLEWVASIHSGGGDTYYRDSVKGRFTISRDNAKNTLYLQMDSLRSEDTATYYCARGRTPTGYYFDHWGQGVMVTVYS | |
| 14 | AIQMTQSPASLSASLGETVTIECRASEGIHNGLAWYQQKPGKSPQLLIYNANSLHSRVPSRFSGSGSGTQFSLKINSLQSEDVASYFCQQYYDYPLTFGSGTKLEIK | |

Sequence listings provided herin

| SEQ ID NO: | Sequence | Origin |
|---|---|---|
| 15 | EVQLLESGGGLVQPGGSLRLSCAPSGFTFSNYGMAWVRQAPGKGLE WVSSIHSGGGDTYYRDSVKGRFTISRDNSKNTLYLQMNSLRAEDTAV YYCARGRTPTGYYFDHWGQGTMVTVSS | |
| 16 | DIQMTQSPSSLSASVGDRVTITCRASEGIHNGLAWYQQKPGKVPKLLI YNANSLHSGVPSRFSGSGSGTDFTLTISSLQPEDVATYFCQQYYDYPL TFGQGTKLEIK | |
| 17 | EVQLVESGGGLVQPGGSLRLSCAASGFTFSNYGMAWVRQAPGKGLE WVASIHSGGGDTYYRDSVKGRFTISRDNAKNSLYLQMNSLRAEDTA VYYCARGRTPTGYYFDHWGQGTMVTVSS | |
| 18 | AIQMTQSPSSLSASVGDRVTITCRASEGIHNGLAWYQQKPGKAPKLLI YNANSLHSGVPSRFSGSGSGTDFTLTISSLQPEDFATYYCQQYYDYPL TFGQGTKLEIK | |
| 19 | EVQLVESGGGLVQPGGSLRLSCAPSGFTFSNYGMAWVRQAPGKGLV WVSSIHSGGGDTYYRDSVKGRFTISRDNAKNTLYLQMNSLRAEDTA VYYCARGRTPTGYYFDHWGQGTMVTVSS | |
| 20 | AIQLTQSPSSLSASVGDRVTITCRASEGIHNGLAWYQQKPGKAPKLLI YNANSLHSRVPSRFSGSGSGTDFTLTISSLQPEDFATYYCQQYYDYPLT FGQGTKLEIK | |
| 21 | QVQLVESGGGVVQPGRSLRLSCAASGFTFSNYGMAWVRQAPGKGLE WVASIHSGGGDTYYRDSVKGRFTISRDNSKNTLYLQMNSLRAEDTAT YYCARGRTPTGYYFDHWGQGTMVTVSS | |
| 22 | DIQMTQSPSSLSASVGDRVTITCRASEGIHNGLAWYQQKPGKAPKRLI YNANSLHSRVPSRFSGSGSGTEFTLTISSLQPEDFATYYCQQYYDYPL TFGQGTKLEIK | |
| 23 | EVQLVESGGVVVQPGGSLRLSCAPSGFTFSNYGMAWVRQAPGKGLE WVSSIHSGGGDTYYADSVKGRFTISRDNSKNSLYLQMNSLRTEDTAL YYCARGRTPTGYYFDHWGQGTMVTVSS | |
| 24 | EIVMTQSPATLSVSPGERATLSCRASEGIHNGLAWYQQKPGQAPRLLI YNANSLHSGIPARFSGSGSGTEFTLTISSLQSEDFAVYFCQQYYDYPLT FGQGTKLEIK | |
| 25 | DIQMTQSPSSLSASVGDRVTITCRASEGIHDGLAWYQQKPGKVPKLLI YNANSLHSGVPSRFSGSGSGTDFTLTISSLQPEDVATYFCQQYYDYPL TFGQGTKLEIK | |
| 26 | DIQMTQSPSSLSASVGDRVTITCRASEGITISGLAWYQQKPGKVPKLLI YNANSLHSGVPSRFSGSGSGTDFTLTISSLQPEDVATYFCQQYYDYPL TFGQGTKLEIK | |
| 27 | DIQMTQSPSSLSASVGDRVTITCRASEGITITGLAWYQQKPGKVPKLLI YNANSLHSGVPSRFSGSGSGTDFTLTISSLQPEDVATYFCQQYYDYPL TFGQGTKLEIK | |
| 28 | DIQMTQSPSSLSASVGDRVTITCRASEGIHLGLAWYQQKPGKVPKLLI YNANSLHSGVPSRFSGSGSGTDFTLTISSLQPEDVATYFCQQYYDYPL TFGQGTKLEIK | |
| 29 | GFTFSNYGMA | |

What is claimed is:

1. A recombinant antibody or antigen binding fragment thereof that binds FMS like tyrosine kinase 3 (FLT3), wherein the recombinant antibody or antigen binding fragment thereof comprises:
   a) a variable region heavy chain complementarity determining region 1 (VH-CDR1) comprising the amino acid sequence set forth in SEQ ID NO: 1 (GFTFSNY); SEQ ID NO: 2 (NYGMA); or SEQ ID NO: 29 (GFTFSNYGMA);
   b) a variable region heavy chain complementarity determining region 2 (VH-CDR2) comprising the amino acid sequence set forth in SEQ ID NO: 3 (HSGGGD) or SEQ ID NO: 4 (SIHSGGGDTYYRDSVKG);
   c) a variable region heavy chain complementarity determining region 3 (VH-CDR3) comprising the amino acid sequence set forth in SEQ ID NO: 5 (GRTPTGYYFDH);
   d) a variable region light chain complementarity determining region 1 (VL-CDR1) comprising the amino acid sequence set forth in SEQ ID NO: 6 (RASEGIHNGLA), SEQ ID NO: 7 (RASEGIHDGLA), SEQ ID NO: 8 (RASEGIHSGLA), SEQ ID NO: 9 (RASEGIHTGLA), or SEQ ID NO: 10 (RASEGIHLGLA);
   e) a variable region light chain complementarity determining region 2 (VL-CDR2) comprising the amino acid sequence set forth in SEQ ID NO: 11 (NANSLHS); and
   f) a variable region light chain complementarity determining region 3 (VL-CDR3) comprising the amino acid sequence set forth in any one of SEQ ID NO: 12 (QQYYDYPLT).

2. A recombinant antibody or antigen binding fragment thereof that binds FMS like tyrosine kinase 3 (FLT3), wherein the recombinant antibody or antigen binding fragment thereof comprises:
   a) a variable region heavy chain complementarity determining region 1 (VH-CDR1) comprising the amino acid sequence set forth in SEQ ID NO: 2 (NYGMA);
   b) a variable region heavy chain complementarity determining region 2 (VH-CDR2) comprising the amino acid sequence set forth in SEQ ID NO: 4 (SIHSGGGDTYYRDSVKG);
   c) a variable region heavy chain complementarity determining region 3 (VH-CDR3) comprising the amino acid sequence set forth in SEQ ID NO: 5 (GRTPTGYYFDH);
   d) a variable region light chain complementarity determining region 1 (VL-CDR1) comprising the amino acid sequence set forth in SEQ ID NO: 8 (RASEGIHSGLA);
   e) a variable region light chain complementarity determining region 2 (VL-CDR2) comprising the amino acid sequence set forth in SEQ ID NO: 11 (NANSLHS); and
   f) a variable region light chain complementarity determining region 3 (VL-CDR3) comprising the amino acid sequence set forth in any one of SEQ ID NO: 12 (QQYYDYPLT).

3. The recombinant antibody or antigen binding fragment thereof of claim 1, wherein the VL-CDR1 comprises the amino acid sequence set forth in SEQ ID NO: 8 (RASEGIHSGLA).

4. The recombinant antibody or antigen binding fragment thereof of claim 1, comprising:
   a) an immunoglobulin heavy chain variable region (VH) sequence comprising an amino acid sequence which is at least about 90% identical to the amino acid sequence set forth in any one of SEQ ID NOs: 15, 17, 19, 21, and 23, or comprising the amino acid sequence set forth in any one of SEQ ID NOs: 15, 17, 19, 21, and 23; and
   b) an immunoglobulin light chain variable region (VL) sequence comprising an amino acid sequence which is at least about 90% identical to the amino acid sequence set forth in any one of SEQ ID NOs: 16, 18, 20, 22, 24, 25, 26, 27, and 28 or comprising the amino acid sequence set forth in any one of SEQ ID NOs: 16, 18, 20, 22, 24, 25, 26, 27, and 28.

5. The recombinant antibody or antigen binding fragment thereof of claim 4, wherein:
   a) the immunoglobulin heavy chain variable region (VH) comprises an amino acid sequence which is at least about 90% identical to the amino acid sequence set forth in SEQ ID NO: 15, or comprises the amino acid sequence set forth in SEQ ID NO: 15; and
   b) the immunoglobulin light chain variable region (VL) comprises an amino acid sequence which is at least about 90% identical to the amino acid sequence set forth in SEQ ID NO: 16, or comprises the amino acid sequence set forth in SEQ ID NO: 16.

6. The recombinant antibody or antigen binding fragment thereof of claim 4, wherein:
   a) the immunoglobulin heavy chain variable region (VH) comprises an amino acid sequence which is at least about 90% identical to the amino acid sequence set forth in SEQ ID NO: 15, or comprises the amino acid sequence set forth in SEQ ID NO: 15; and
   b) the immunoglobulin light chain variable region (VL) comprises an amino acid sequence which is at least about 90% identical to the amino acid sequence set forth in SEQ ID NO: 26, or comprises the amino acid sequence set forth in SEQ ID NO: 26.

7. The recombinant antibody or antigen binding fragment thereof of claim 1, wherein the recombinant antibody or antigen binding fragment thereof is chimeric or humanized.

8. The recombinant antibody or antigen binding fragment thereof of claim 1, wherein the recombinant antibody or antigen binding fragment thereof is an IgG antibody.

9. The recombinant antibody or antigen binding fragment thereof of claim 1, wherein the recombinant antibody or antigen binding fragment thereof comprises one or more mutations to reduce one or more effector functions of the recombinant antibody or antigen binding fragment thereof.

10. The recombinant antibody or antigen binding fragment thereof of claim 1, wherein a heavy chain constant region of the recombinant antibody or antigen binding fragment thereof comprises an IGg4 heavy chain constant region comprising any of the amino acid modifications or sets of modifications selected from: N434A, N434H, T307A/E380A/N434A, M252Y/S254T/T256E, 433K/434F/436H, T250Q, T250F, M428L, M428F, T250Q/M428L, N434S, V308W, V308Y, V308F, M252Y/M428L, D259I/V308F, M428L/V308F, Q311V/N434S, T307Q/N434A, E258F/V427T, S228P, L235E, S228P/L235E/R409K, S228P/L235E, K370Q, K370E, deletion of G446, deletion of K447, and any combination thereof, wherein said IgG4 modifications are specified according to the EU numbering system.

11. The recombinant antibody or antigen binding fragment thereof of claim 1, wherein the recombinant antibody or antigen binding fragment thereof comprises a Fab, F(ab)$_2$, or a single chain variable fragment (scFv).

12. The recombinant antibody or antigen binding fragment thereof of claim 1, wherein said recombinant antibody or antigen binding fragment thereof is conjugated to an immunomodulating moiety.

13. The recombinant antibody or antigen binding fragment thereof of claim 12, wherein the immunomodulating moiety is a stimulator of interferon genes protein (STING) agonist.

14. A pharmaceutical composition comprising the recombinant antibody or antigen binding fragment thereof of claim 1 and a pharmaceutically acceptable excipient, carrier, or diluent.

15. The pharmaceutical composition of claim 14, wherein said composition is formulated for intravenous administration.

16. The pharmaceutical composition of claim 14, wherein said composition is formulated for subcutaneous administration.

17. The pharmaceutical composition of claim 14, wherein said composition is formulated for intratumoral administration.

18. A method of expanding or differentiating populations of dendritic cells or hematologic dendritic cell precursors in an individual, comprising administering the recombinant antibody or antigen binding fragment thereof of claim 1 to the individual.

19. The method of claim 18, wherein the dendritic cells or hematologic dendritic cell precursors comprise conventional dendritic cells subset cDC1, conventional dendritic cells subset cDC2, plasmacytoid dendritic cells, or any combination thereof.

20. A nucleic acid or nucleic acids encoding the recombinant antibody or antigen binding fragment thereof of claim 1.

21. A cell comprising the nucleic acid or nucleic acids of claim 20.

22. The cell of claim 21, wherein the cell is a eukaryotic cell.

23. The cell of claim 22, wherein the cell is a Chinese Hamster Ovary (CHO) cell.

24. A method of making a recombinant antibody or antigen binding fragment thereof, comprising culturing a cell comprising a nucleic acid or nucleic acids encoding the recombinant antibody or antigen binding fragment thereof of claim 7 in a culture medium under conditions sufficient to secrete the recombinant antibody or antigen binding fragment thereof.

25. The method of claim 24, further comprising subjecting the antibody or antigen binding fragment thereof to at least one purification step.

26. A method of making a pharmaceutical composition, comprising admixing the recombinant antibody or antigen binding fragment thereof of claim 1 and a pharmaceutically acceptable excipient, carrier, or diluent.

27. A recombinant antibody or antigen binding fragment thereof that binds FMS like tyrosine kinase 3 (FLT3), wherein the recombinant antibody or antigen binding fragment thereof comprises:
   a) an immunoglobulin heavy chain variable region (VH) comprising the amino acid sequence set forth in SEQ ID NO: 15; and
   b) an immunoglobulin light chain variable region (VL) comprising the amino acid sequence set forth in SEQ ID NO: 26.

28. The recombinant antibody or antigen binding fragment thereof of claim 27, wherein the recombinant antibody or antigen binding fragment thereof is chimeric or humanized.

29. The recombinant antibody or antigen binding fragment thereof of claim 27, wherein the recombinant antibody or antigen binding fragment thereof is an IgG antibody.

30. The recombinant antibody or antigen binding fragment thereof of claim 27, wherein the recombinant antibody or antigen binding fragment thereof comprises one or more mutations to reduce one or more effector functions of the recombinant antibody or antigen binding fragment thereof.

31. The recombinant antibody or antigen binding fragment thereof of claim 27, wherein a heavy chain constant region of the recombinant antibody or antigen binding fragment thereof comprises an IGg4 heavy chain constant region comprising any of the amino acid modifications or sets of modifications selected from: N434A, N434H, T307A/E380A/N434A, M252Y/S254T/T256E, 433K/434F/436H, T250Q, T250F, M428L, M428F, T250Q/M428L, N434S, V308W, V308Y, V308F, M252Y/M428L, D259I/V308F, M428L/V308F, Q311V/N434S, T307Q/N434A, E258F/V427T, S228P, L235E, S228P/L235E/R409K, S228P/L235E, K370Q, K370E, deletion of G446, deletion of K447, and any combination thereof, wherein said IgG4 modifications are specified according to the EU numbering system.

32. The recombinant antibody or antigen binding fragment thereof of claim 27, wherein the recombinant antibody or antigen binding fragment thereof comprises a Fab, F(ab)$_2$, or a single chain variable fragment (scFv).

33. The recombinant antibody or antigen binding fragment thereof of claim 27, wherein the recombinant antibody or antigen binding fragment thereof comprises a F(ab)$_2$.

34. A pharmaceutical composition comprising the recombinant antibody or antigen binding fragment thereof of claim 27 and a pharmaceutically acceptable excipient, carrier, or diluent.

35. The pharmaceutical composition of claim 34, wherein said composition is formulated for intravenous administration or subcutaneous administration.

36. A method of expanding or differentiating populations of dendritic cells or hematologic dendritic cell precursors in an individual, comprising administering the recombinant antibody or antigen binding fragment thereof of claim 27 to the individual.

37. The method of claim 36, wherein the dendritic cells or hematologic dendritic cell precursors comprise conventional dendritic cells subset cDC1, conventional dendritic cells subset cDC2, plasmacytoid dendritic cells, or any combination thereof.

38. A nucleic acid or nucleic acids encoding the recombinant antibody or antigen binding fragment thereof of claim 27.

39. A cell comprising the nucleic acid or nucleic acids of claim 38.

40. The cell of claim 39, wherein the cell is a eukaryotic cell.

41. The cell of claim 40, wherein the cell is a Chinese Hamster Ovary (CHO) cell.

42. A method of making a recombinant antibody or antigen binding fragment thereof, comprising culturing a cell comprising a nucleic acid or nucleic acids encoding the recombinant antibody or antigen binding fragment thereof of claim 27 in a culture medium under conditions sufficient to secrete the recombinant antibody or antigen binding fragment thereof.

43. The method of claim 42, further comprising subjecting the antibody or antigen binding fragment thereof to at least one purification step.

44. A method of making a pharmaceutical composition, comprising admixing the recombinant antibody or antigen binding fragment thereof of claim 27 and a pharmaceutically acceptable excipient, carrier, or diluent.

45. The recombinant antibody or antigen binding fragment thereof of claim 1, wherein the recombinant antibody or antigen binding fragment thereof comprises a F(ab)$_2$.

46. A recombinant antibody or antigen binding fragment thereof that binds FMS like tyrosine kinase 3 (FLT3), wherein the recombinant antibody or antigen binding fragment thereof comprises:
  c) an immunoglobulin heavy chain variable region (VH) having an amino acid sequence consisting of the amino acid sequence set forth in SEQ ID NO: 15; and
  d) an immunoglobulin light chain variable region (VL) having an amino acid sequence consisting of the amino acid sequence set forth in SEQ ID NO: 26.

47. The recombinant antibody or antigen binding fragment thereof of claim 46, wherein the recombinant antibody or antigen binding fragment thereof is chimeric or humanized.

48. The recombinant antibody or antigen binding fragment thereof of claim 46, wherein the recombinant antibody or antigen binding fragment thereof is an IgG antibody.

49. The recombinant antibody or antigen binding fragment thereof of claim 46, wherein the recombinant antibody or antigen binding fragment thereof comprises one or more mutations to reduce one or more effector functions of the recombinant antibody or antigen binding fragment thereof.

50. The recombinant antibody or antigen binding fragment thereof of claim 46, wherein a heavy chain constant region of the recombinant antibody or antigen binding fragment thereof comprises an IGg4 heavy chain constant region comprising any of the amino acid modifications or sets of modifications selected from: N434A, N434H, T307A/E380A/N434A, M252Y/S254T/T256E, 433K/434F/436H, T250Q, T250F, M428L, M428F, T250Q/M428L, N434S, V308W, V308Y, V308F, M252Y/M428L, D259I/V308F, M428L/V308F, Q311V/N434S, T307Q/N434A, E258F/V427T, S228P, L235E, S228P/L235E/R409K, S228P/L235E, K370Q, K370E, deletion of G446, deletion of K447, and any combination thereof, wherein said IgG4 modifications are specified according to the EU numbering system.

51. The recombinant antibody or antigen binding fragment thereof of claim 46, wherein the recombinant antibody or antigen binding fragment thereof comprises a Fab, F(ab)$_2$, or a single chain variable fragment (scFv).

52. The recombinant antibody or antigen binding fragment thereof of claim 46, wherein the recombinant antibody or antigen binding fragment thereof comprises a F(ab)$_2$.

53. A pharmaceutical composition comprising the recombinant antibody or antigen binding fragment thereof of claim 46 and a pharmaceutically acceptable excipient, carrier, or diluent.

54. The pharmaceutical composition of claim 53, wherein said composition is formulated for intravenous administration or subcutaneous administration.

55. A method of expanding or differentiating populations of dendritic cells or hematologic dendritic cell precursors in an individual, comprising administering the recombinant antibody or antigen binding fragment thereof of claim 46 to the individual.

56. The method of claim 55, wherein the dendritic cells or hematologic dendritic cell precursors comprise conventional dendritic cells subset cDC1, conventional dendritic cells subset cDC2, plasmacytoid dendritic cells, or any combination thereof.

57. A nucleic acid or nucleic acids encoding the recombinant antibody or antigen binding fragment thereof of claim 46.

58. A cell comprising the nucleic acid or nucleic acids of claim 57.

59. The cell of claim 58, wherein the cell is a eukaryotic cell.

60. The cell of claim 59, wherein the cell is a Chinese Hamster Ovary (CHO) cell.

61. A method of making a recombinant antibody or antigen binding fragment thereof, comprising culturing a cell comprising a nucleic acid or nucleic acids encoding the recombinant antibody or antigen binding fragment thereof of claim 46 in a culture medium under conditions sufficient to secrete the recombinant antibody or antigen binding fragment thereof.

62. The method of claim 61, further comprising subjecting the antibody or antigen binding fragment thereof to at least one purification step.

63. A method of making a pharmaceutical composition, comprising admixing the recombinant antibody or antigen binding fragment thereof of claim 46 and a pharmaceutically acceptable excipient, carrier, or diluent.

\* \* \* \* \*